United States Patent
Taki et al.

(10) Patent No.: US 7,602,293 B2
(45) Date of Patent: Oct. 13, 2009

(54) INTERROGATOR FOR RFID TAG

(75) Inventors: Kazunari Taki, Nagoya (JP); Tsuyoshi Ohashi, Hashima (JP); Takuya Nagai, Nagoya (JP); Kentaro Ushiyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 350 days.

(21) Appl. No.: 11/611,468

(22) Filed: Dec. 15, 2006

(65) Prior Publication Data

US 2007/0080787 A1  Apr. 12, 2007

Related U.S. Application Data

(63) Continuation-in-part of application No. PCT/JP2005/010776, filed on Jun. 13, 2005.

(30) Foreign Application Priority Data

Jun. 15, 2004  (JP)  ............... 2004-176411

(51) Int. Cl.
    G08B 13/14  (2006.01)
(52) U.S. Cl. ............... 340/572.1; 340/572.4; 340/572.7
(58) Field of Classification Search .............. 340/572.1, 340/572.4, 572.7, 572.9, 505, 506, 539.11, 340/539.13, 10.1; 455/277.1, 277.2, 562; 342/374, 359
See application file for complete search history.

(56) References Cited

U.S. PATENT DOCUMENTS

| 5,751,227 A | 5/1998 | Yoshida et al. | |
| 6,188,913 B1 * | 2/2001 | Fukagawa et al. | 455/562.1 |
| 6,774,845 B2 * | 8/2004 | De Champlain | 342/374 |
| 7,062,246 B2 * | 6/2006 | Owen | 455/277.1 |
| 7,187,288 B2 * | 3/2007 | Mendolia et al. | 340/572.1 |

FOREIGN PATENT DOCUMENTS

| EP | 0944015 A3 | 3/2000 |
| JP | H08-500223 A | 1/1996 |
| JP | H08-180228 A | 7/1996 |
| JP | H11-344562 A | 12/1999 |
| JP | 2002-271229 A | 9/2002 |
| WO | 94/05090 A1 | 3/1994 |
| ZA | 99/2142 A | 3/1999 |

OTHER PUBLICATIONS

The International Bureau of WIPO, International Preliminary Report on Patentability (for corresponding International Patent Appl'n. No. PCT/JP2005/010776) mailed Sep. 20, 2007.
The State Intellectual Property Office of the People's Republic of China, Notification of the First Office Action issued Oct. 31, 2008, in counterpart Patent Application No. CN 200580019630.2.
Japan Patent Office, Notice of Reasons of Rejections mailed Sep. 8, 2008, in counterpart Patent Application No. JP 2006-514726.

* cited by examiner

*Primary Examiner*—Van T. Trieu
(74) *Attorney, Agent, or Firm*—Baker Botts, LLP.

(57) ABSTRACT

An interrogator has antennas for communicating information in a non-contact manner with an IC circuit part of a RFID circuit element to be interrogated, a control circuit, and a radio frequency circuit including a directivity switching control portion. In accordance with at least said communication distance of information communication, the control circuit and the directivity switching control portion perform control so as to broaden the directivity of the antennas when said communication distance is short and to narrow the directivity of the antennas when said communication distance is long.

14 Claims, 13 Drawing Sheets

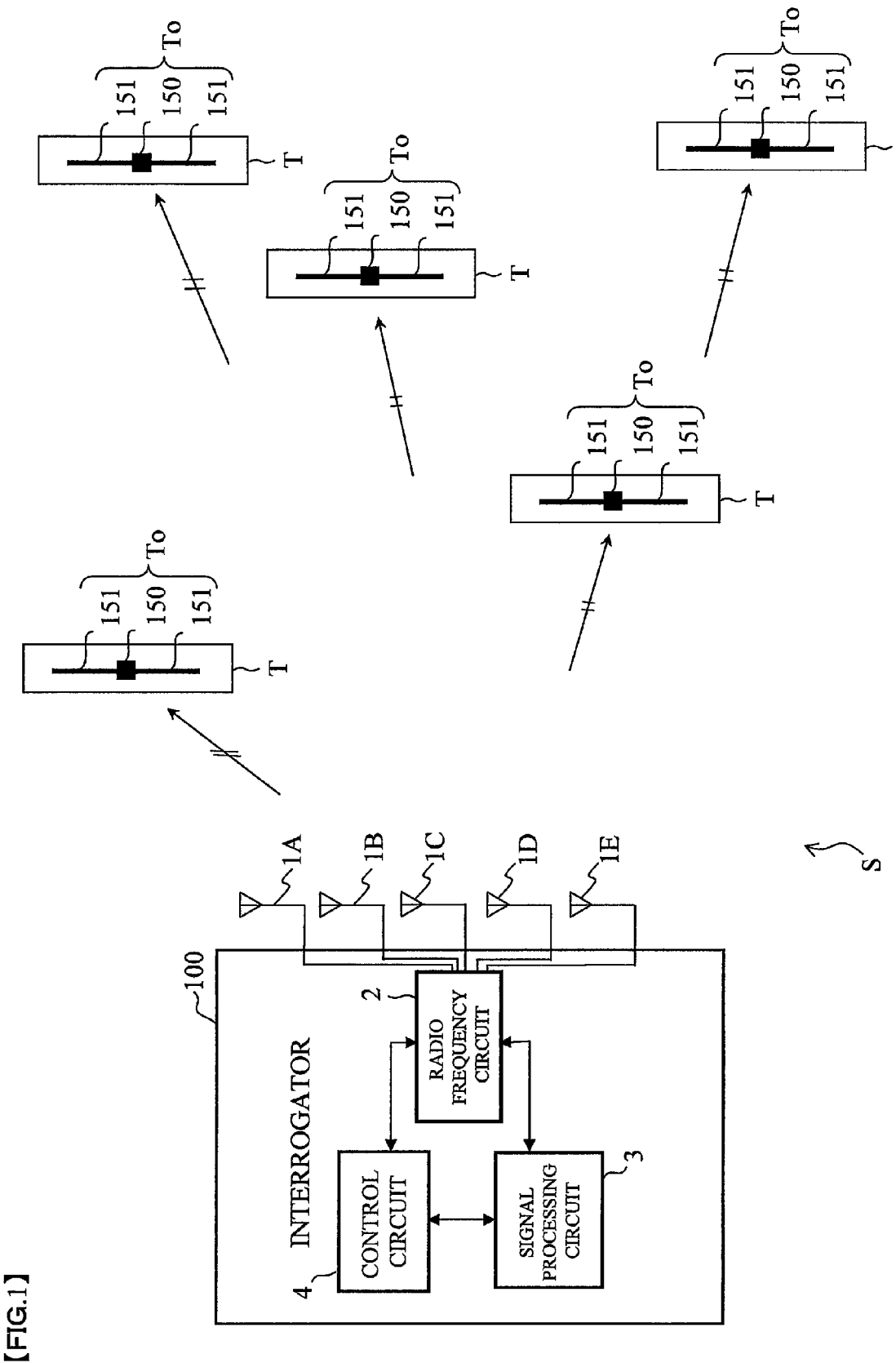
[FIG.1]

[FIG.2]
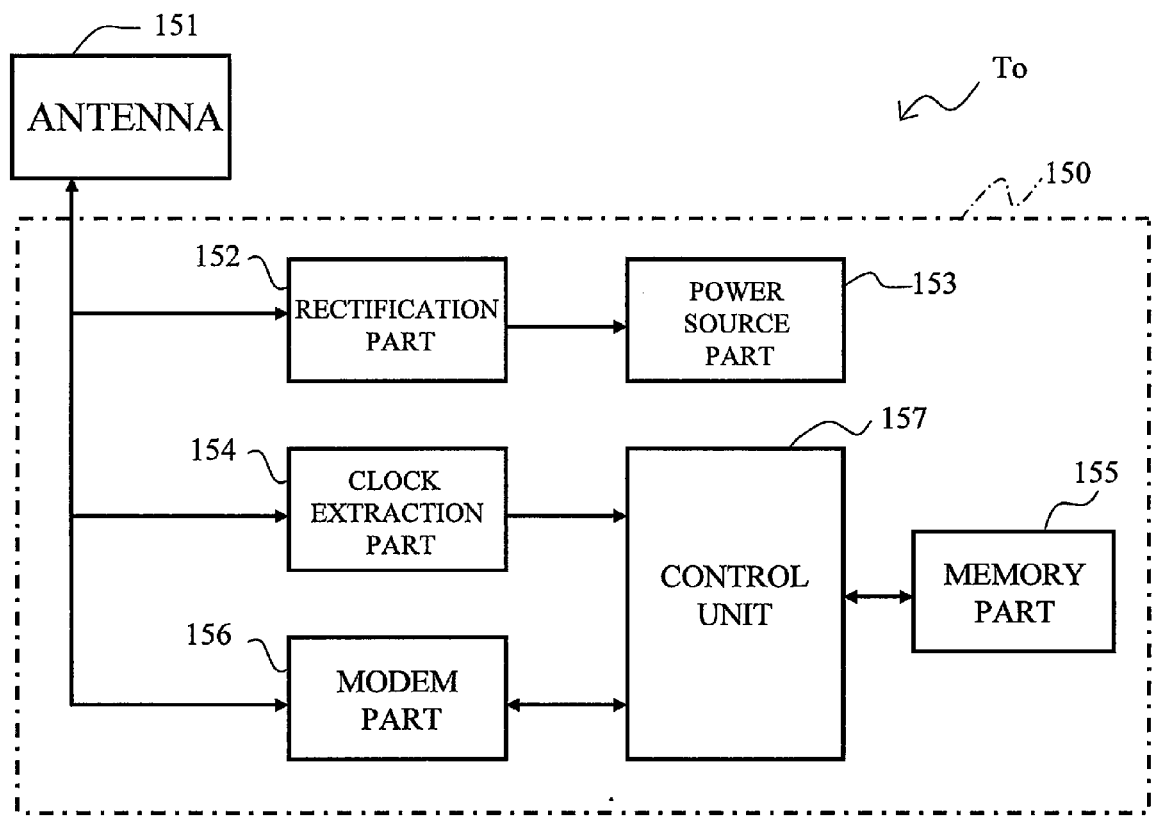

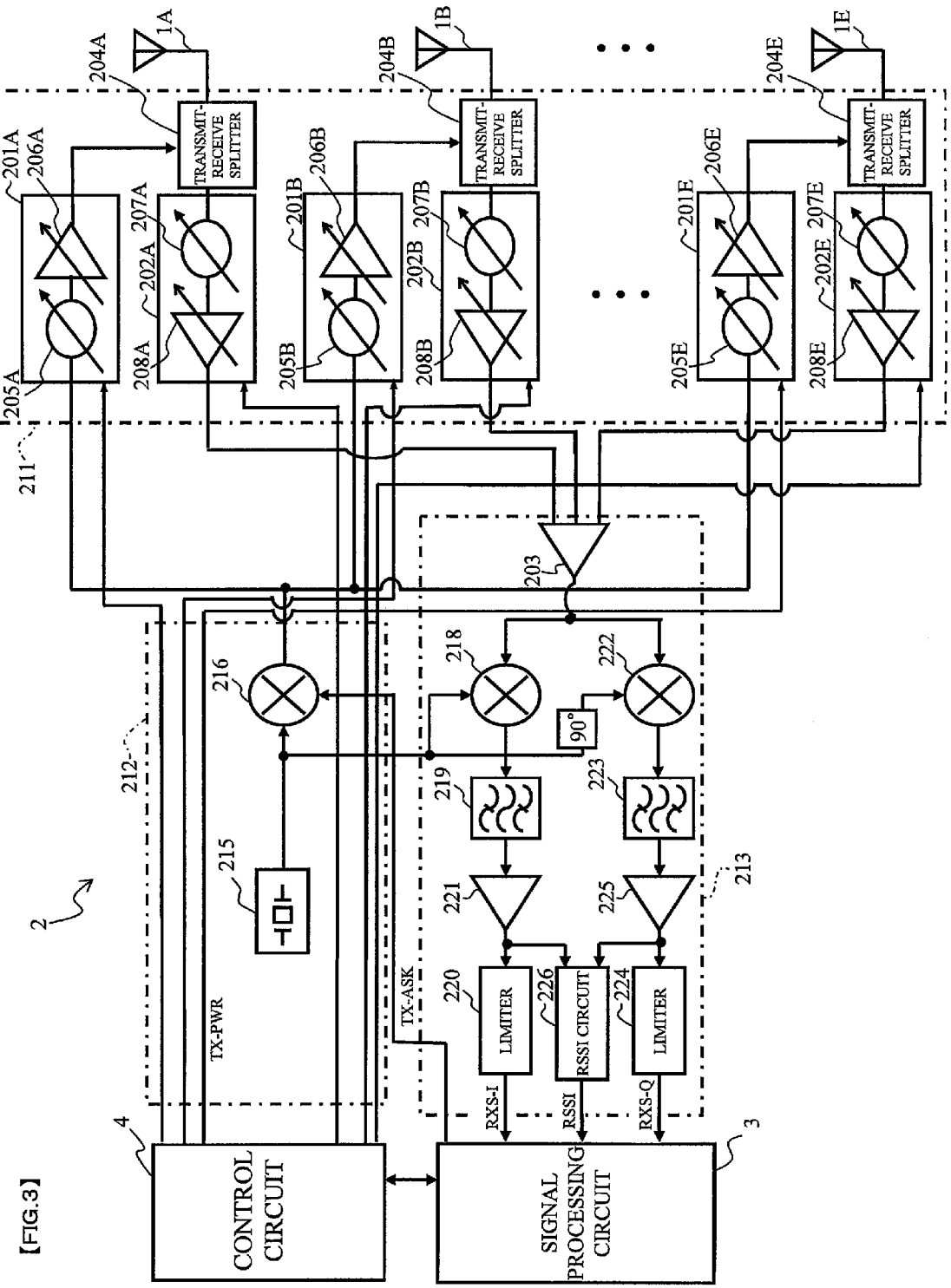

[FIG.4A]
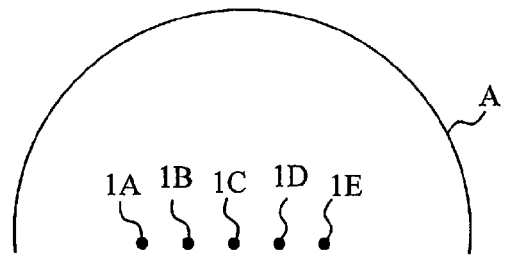
[FIG.4B]
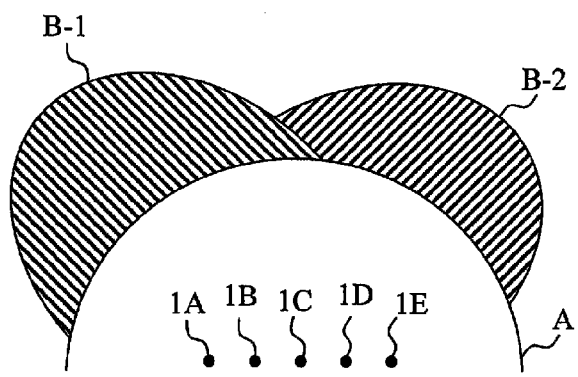
[FIG.4C]
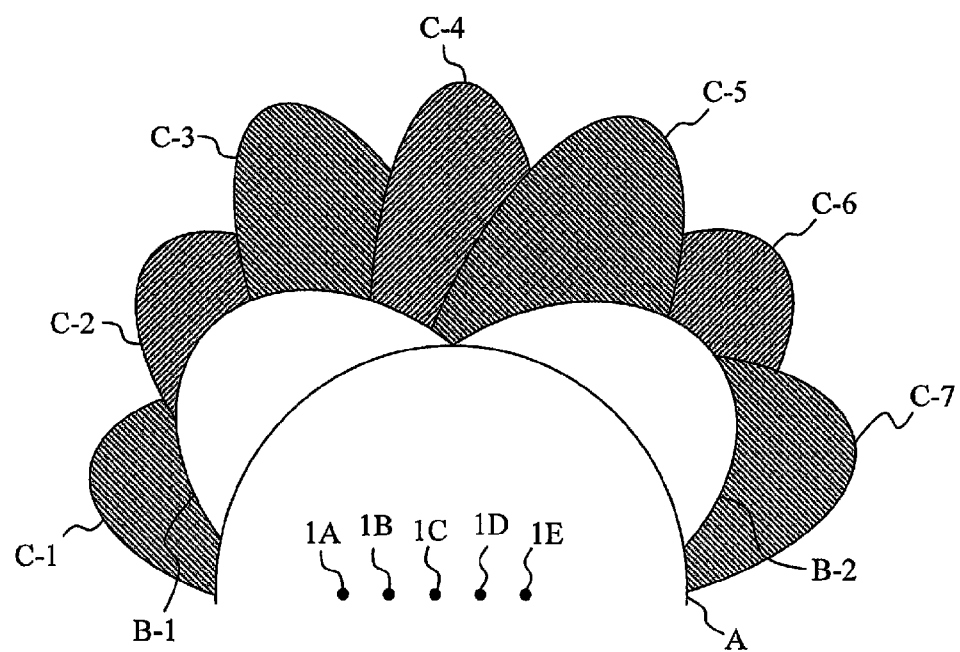

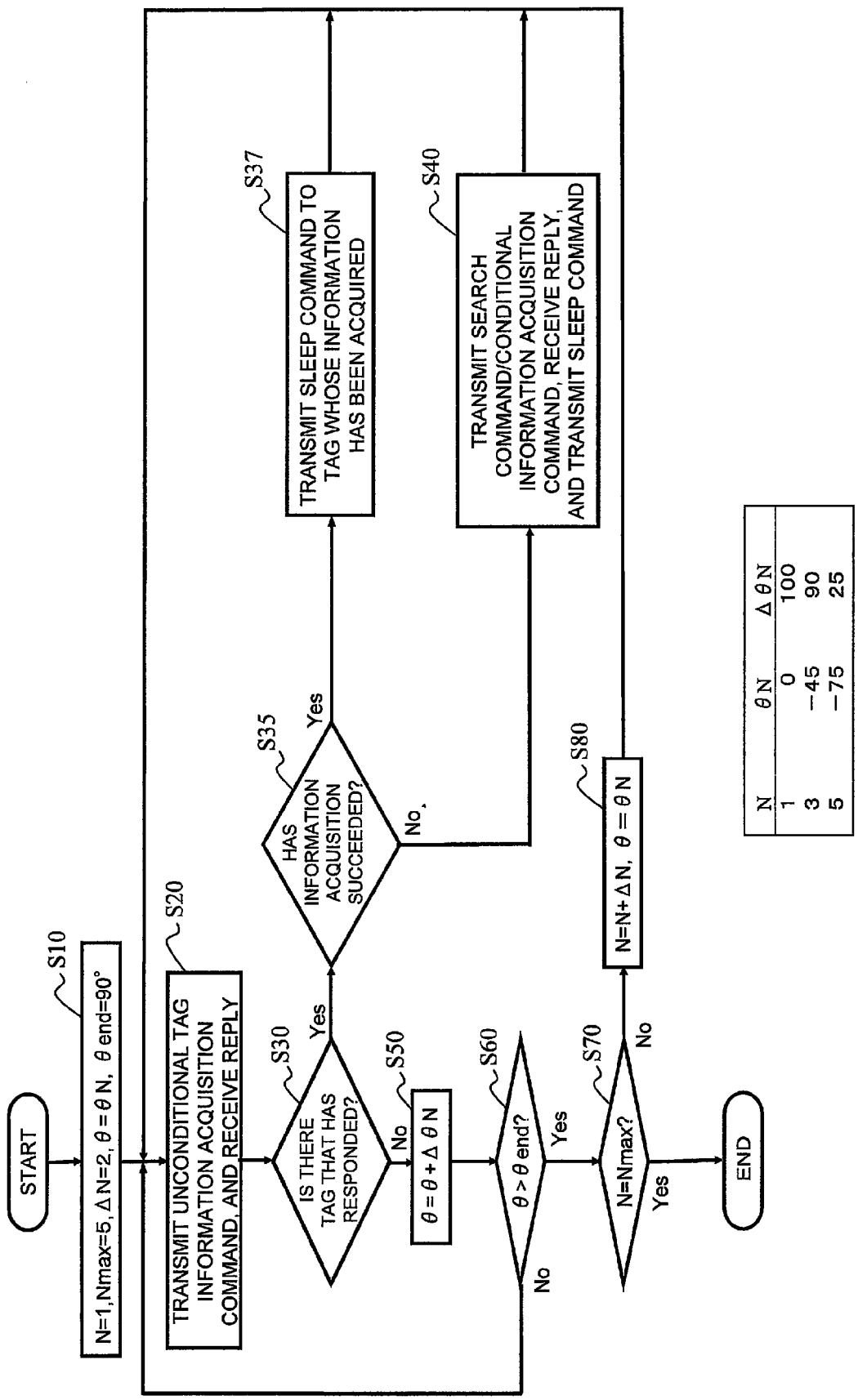
[FIG.5]

[FIG. 6A]
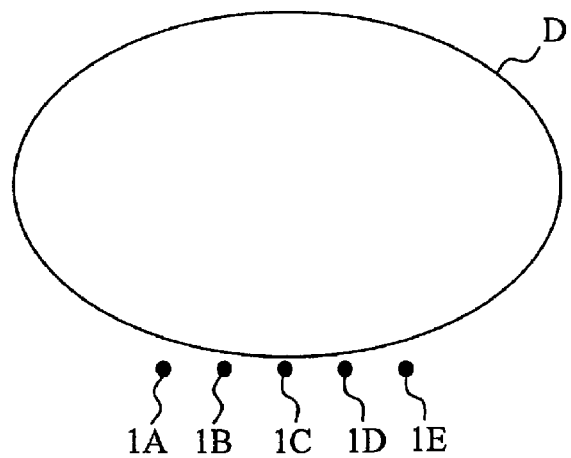
[FIG. 6B]
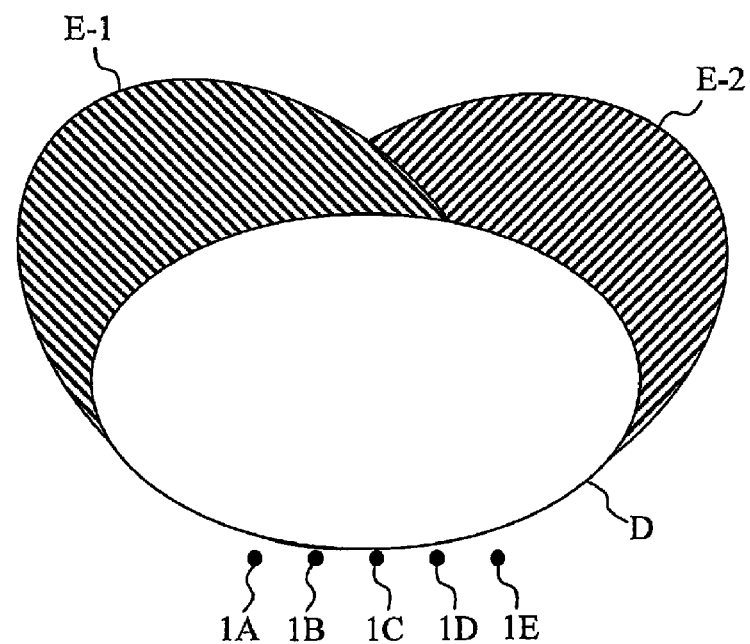

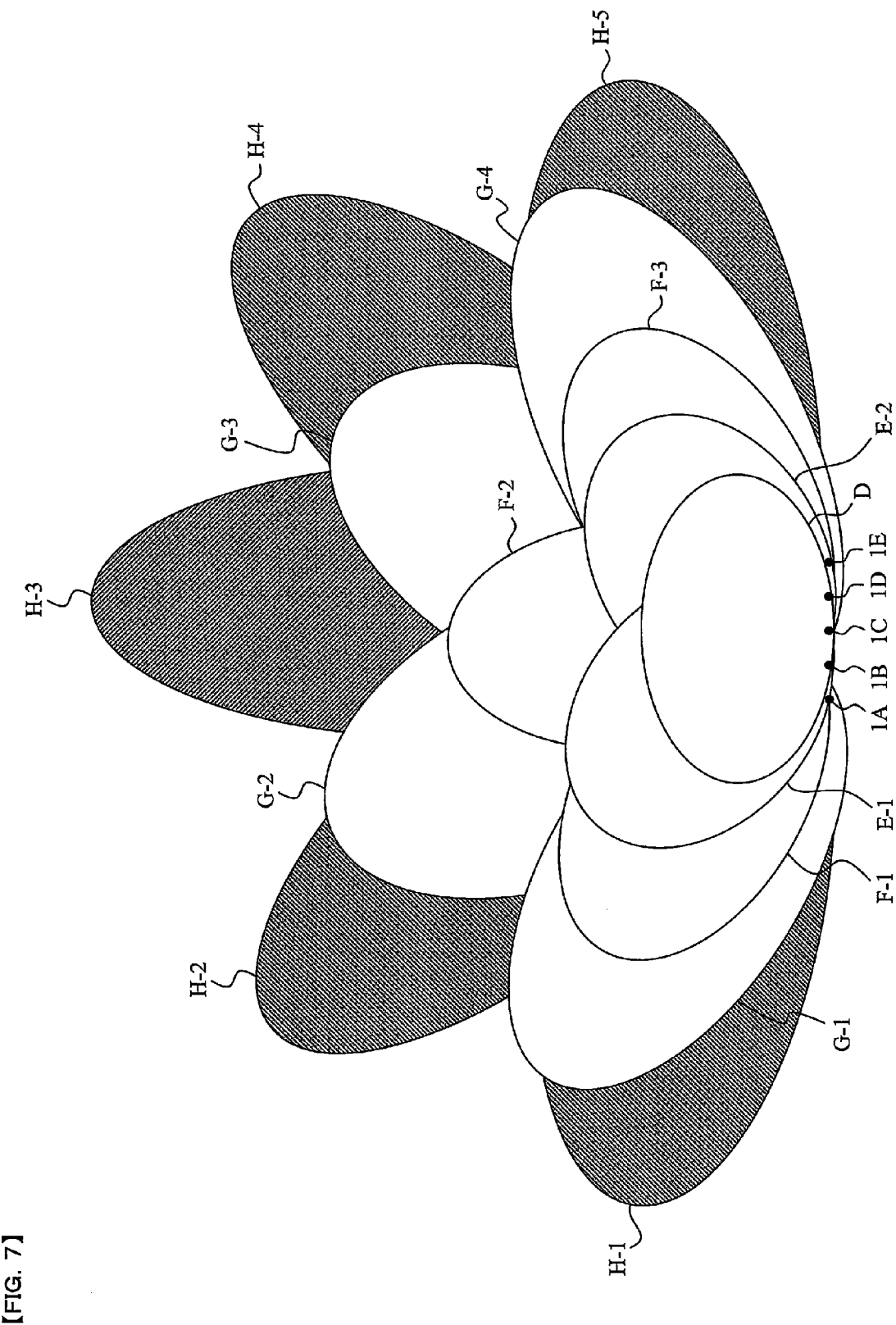
[FIG. 7]

[FIG. 8A]
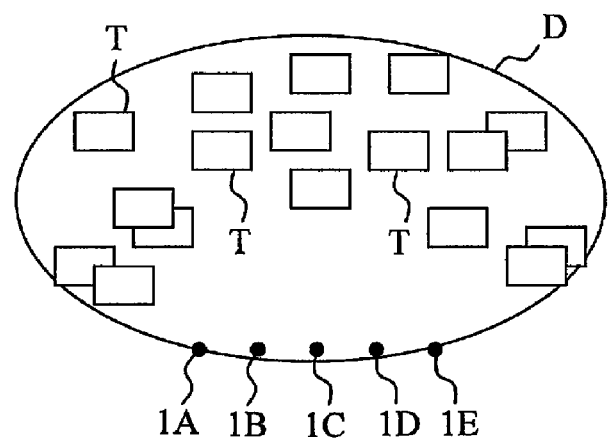
[FIG. 8B]
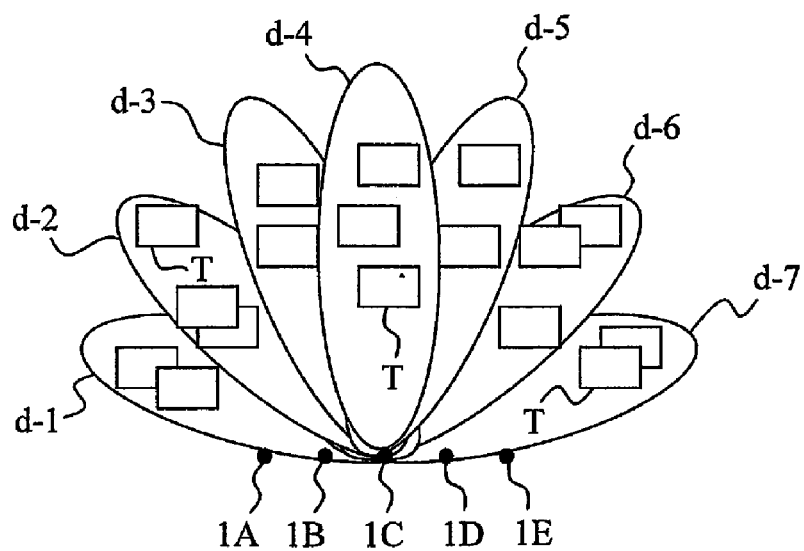

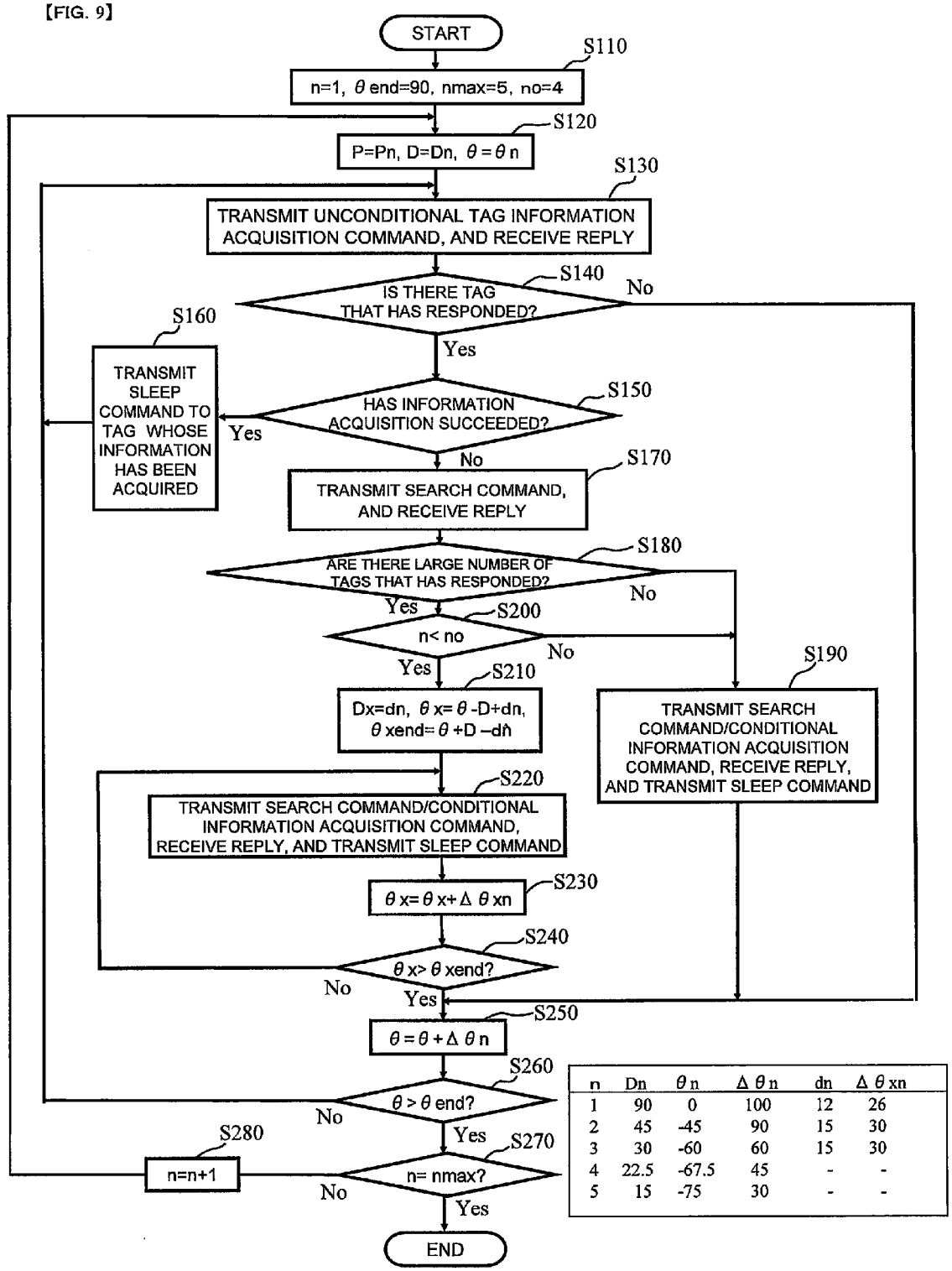
[FIG. 9]

[FIG. 10A]
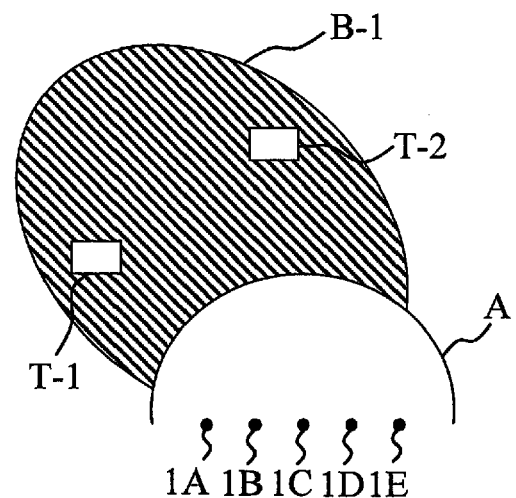
[FIG. 10B]
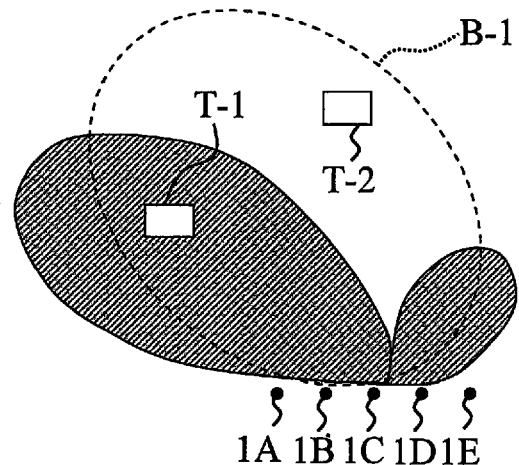
[FIG. 10C]
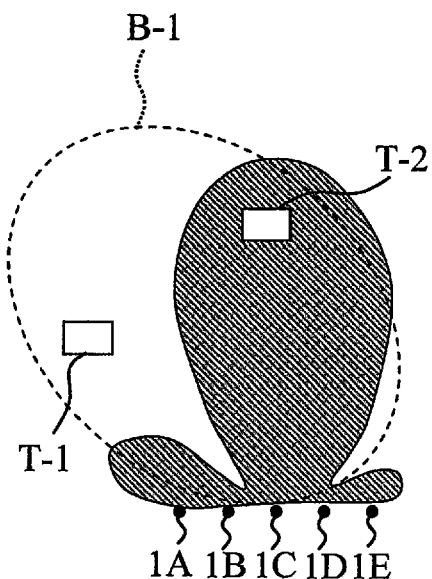

[FIG. 11]
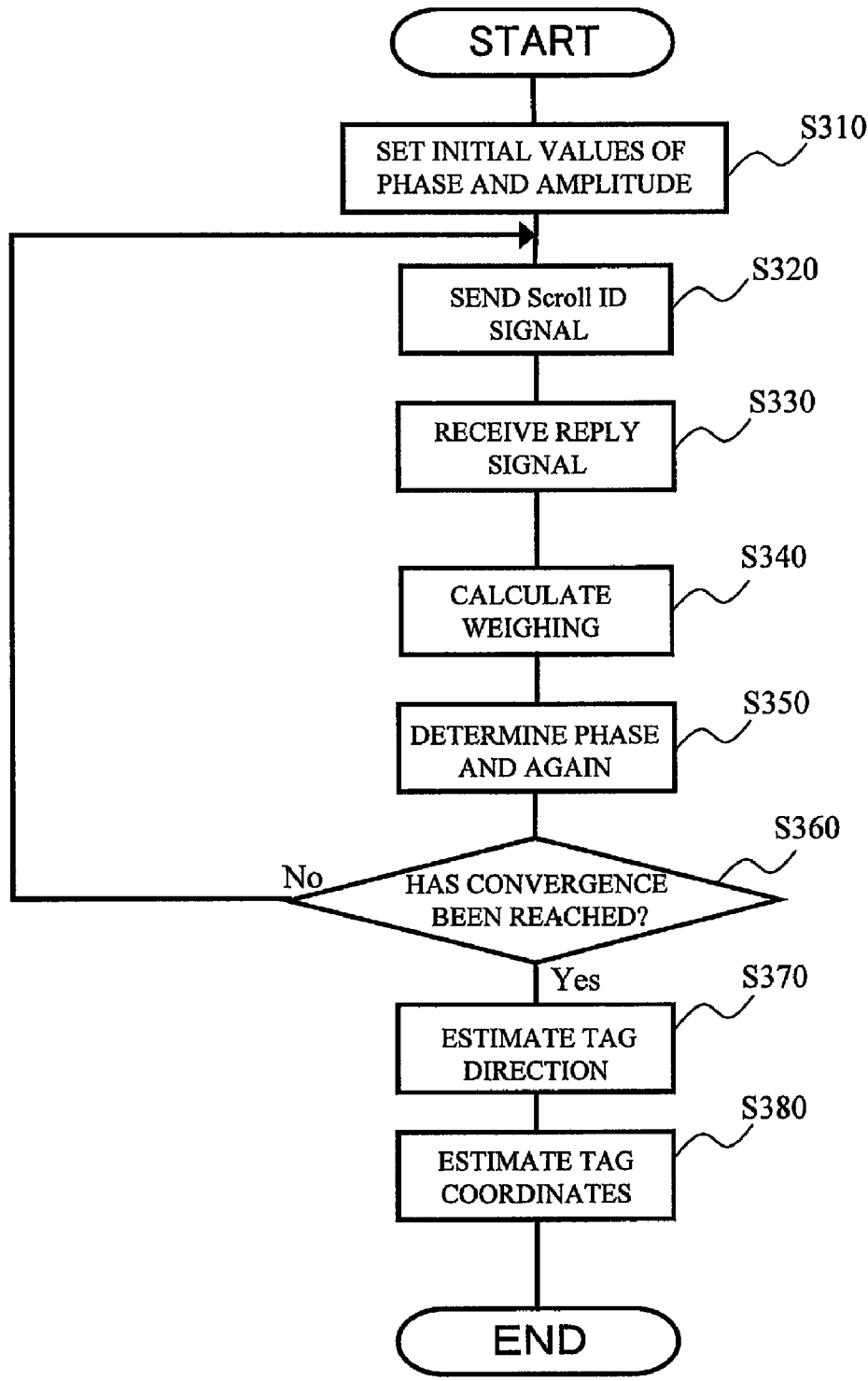

[FIG. 12A]
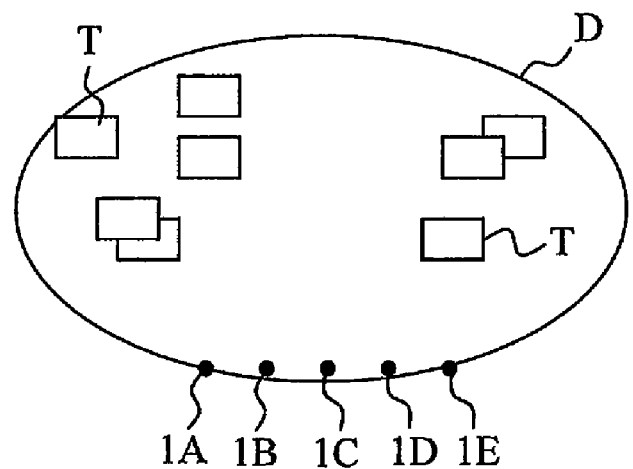
[FIG. 12B]
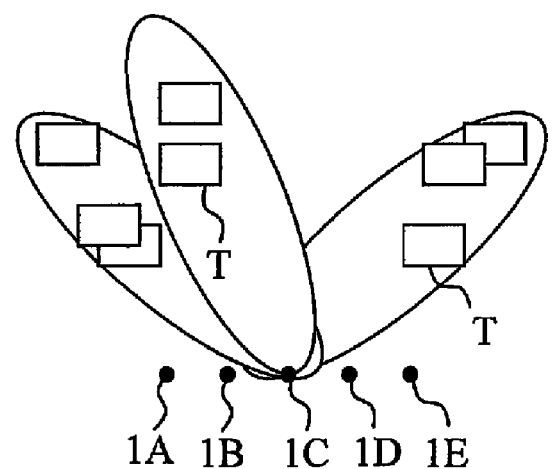

【FIG. 13】
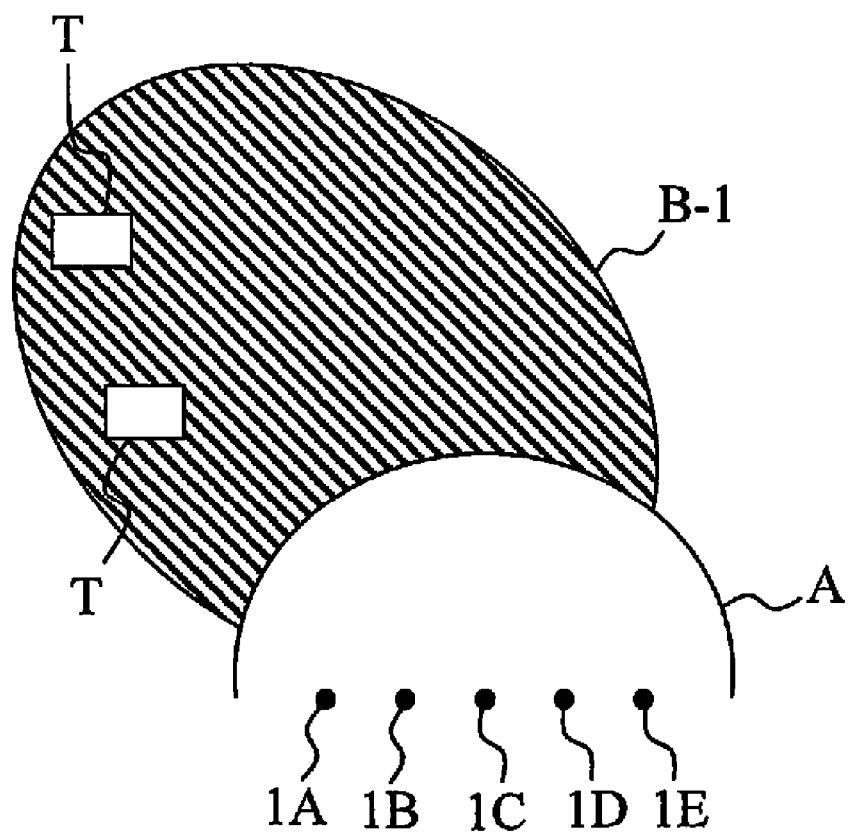

INTERROGATOR FOR RFID TAG

CROSS-REFERENCE TO RELATED APPLICATION

This is a CIP application PCT/JP2005/10776, filed Jun. 13, 2005, which was not published under PCT article 21 (2) in English.

BACKGROUND OF THE INVENTION

1. Field of the Invention

The present invention relates to an interrogator for a RFID tag communication system for performing reading or writing of information with respect to a RFID tag capable of wireless communication of information with the outside.

2. Description of the Related Art

A RFID (Radio Frequency Identification) system is known in which reading/writing of RFID tag information is performed by transmitting a query to and receiving a reply from a small-sized RFID tag as a transponder in a non-contact manner by means of a reader/writer as an interrogator.

For example, a RFID circuit element provided in a label-like RFID tag is equipped with an IC circuit part for storing predetermined RFID tag information, and an antenna connected to this IC circuit part to transmit/receive information. Since the reader/writer can make access (reading/writing of information) to the IC circuit part even in such a case where the RFID tag is soiled or the RFID tag is arranged at a position where it cannot be seen, the practical use of RFID systems is being anticipated for a variety of fields such as merchandise management and inspection processes.

In the related art, there is a technique according to which when making access to RFID tag information of the IC circuit part of the RFID circuit element as described above, by taking advantage of the fact that a RFID circuit element located closer to the device-side antenna can be accessed by means of a smaller output, a signal of a given output value is transmitted and a group of tags responding to this signal is recognized, and thereafter, these tags are put to sleep and a signal of a slightly larger output value is transmitted, and a group of tags responding to this signal is recognized as a group of tags more distant than the above-mentioned group of tags that have been put to sleep, and this process is repeated to thereby recognize the distributed positions of all the tags with respect to a plurality of split areas (see, for example, Patent Document 1).

Patent Publication 1: JP,A, 11-344562 (paragraphs 0019 to 0032, FIGS. 3 and 4)

In the above-mentioned related art, while gradually increasing the output value of a transmission signal, groups of tags that have responded within a substantially annular area corresponding to the output value are sequentially recognized, and this process is repeated to thereby recognize the distributed positions of all the tags with respect to a plurality of split substantially annular areas. At this time, the directivity of the interrogator-side antenna is not particularly changed; transmission/reception of a signal is performed with broad directivity both in the case where signal transmission/reception is performed with respect to a RFID circuit element located at a relatively short distance and the case where transmission/reception is performed with respect to a RFID circuit element located at a relatively long distance.

Since groups of tags located within the substantially annular areas are integrally recognized, to make access to these tags individually, it is necessary to perform a separate search by sequentially specifying a part of identification information of each of the tags, so the required identification time greatly increases as the number of tags becomes larger. As a result, when RFID circuit elements are distributed over a broad area, a huge amount of time is required for making access to each of the RFID circuit elements, making it impossible to perform transmission/reception of RFID tag information efficiently in a short period of time.

SUMMARY OF THE INVENTION

It is an object of the present invention to provide an interrogator for a RFID tag communication system which allows transmission/reception of RFID tag information to be performed efficiently in a short period of time even when RFID circuit elements are distributed over a broad area.

BRIEF DESCRIPTION OF THE DRAWING

FIG. 1 is a system configuration diagram showing the general outline of a RFID tag communication system to which a first embodiment of the present invention is applied.

FIG. 2 is a block diagram showing an example of the functional configuration of a RFID circuit element equipped in a RFID tag.

FIG. 3 is a functional block diagram showing the functional configuration of a radio frequency circuit equipped in an interrogator shown in FIG. 1.

FIG. 4A is an explanatory diagram conceptually illustrating the behaviors of directivity control for antennas by the interrogator.

FIG. 4B is an explanatory diagram conceptually illustrating the behaviors of directivity control for antennas by the interrogator.

FIG. 4C is an explanatory diagram conceptually illustrating the behaviors of directivity control for antennas by the interrogator.

FIG. 5 is a flow chart illustrating the procedures of control performed by a control circuit shown in FIG. 1 in order to execute directivity switching control for the antennas by the interrogator.

FIG. 6A is an explanatory diagram conceptually illustrating the behaviors of directivity control for the antennas by an interrogator according to a second embodiment of the present invention.

FIG. 6B is an explanatory diagram conceptually illustrating the behaviors of directivity control for the antennas by an interrogator according to a second embodiment of the present invention.

FIG. 7 is an explanatory diagram conceptually illustrating the behaviors of directivity control for the antennas by the interrogator according to the second embodiment of the present invention.

FIG. 8A is an explanatory diagram conceptually illustrating the behaviors of search based on area subdivision (splitting) by the interrogator.

FIG. 8B is an explanatory diagram conceptually illustrating the behaviors of search based on area subdivision (splitting) by the interrogator.

FIG. 9 is a flow chart illustrating the procedures of control performed by the control circuit in order to execute directivity switching control for the antennas.

FIG. 10A is a diagram illustrating a modification in which an adaptive array control is performed only at the time of reception.

FIG. 10B is a diagram illustrating a modification in which an adaptive array control is performed only at the time of reception.

FIG. 10C is a diagram illustrating a modification in which an adaptive array control is performed only at the time of reception.

FIG. 11 is a flow chart illustrating the procedures of control according to the adaptive array control executed by the control circuit in the modification shown in FIG. 10.

FIG. 12A is a diagram illustrating the behaviors of search according to a modification in which a reception signal is subjected to adaptive array processing instead of transmitting a search command after subdivision into small areas.

FIG. 12B is a diagram illustrating the behaviors of search according to a modification in which a reception signal is subjected to adaptive array processing instead of transmitting a search command after subdivision into small areas.

FIG. 13 is a diagram illustrating a case where two RFID tags are present in the same direction and cannot be discriminated from each other by directivity through the above-mentioned adaptive control at the time of reception.

DETAILED DESCRIPTION OF THE PREFERRED EMBODIMENTS

A first embodiment of the present invention will now be described with reference to the drawings.

FIG. 1 is a system configuration diagram showing the general outline of a RFID tag communication system to which this embodiment is applied.

In FIG. 1, a RFID communication system S includes an interrogator 100 according to this embodiment, and a plurality of RFID tags T serving as transponders corresponding to the interrogator 100.

Each RFID tag T has a RFID circuit element To equipped with antennas 151 and an IC circuit part 150.

The interrogator 100 has five antennas (antenna elements) 1A to 1E in this example for performing exchange of signals with the antennas 151 of the RFID circuit element To, a radio frequency circuit 2 for accessing (for reading from or writing to) the IC circuit part 150 of the RFID circuit element To via the antennas 1A to 1E, a signal processing circuit 3 for processing a signal read out from the IC circuit part 150 of the RFID circuit element To, and a control circuit 4.

The antennas 1A to 1E are arranged at a predetermined interval, and due to the directivity control that will be described later, the directivity of the antennas as a whole is adapted to be electronically controlled.

The control circuit 4 is a so-called microcomputer; although detailed description is omitted, the control circuit 4 is composed of a CPU as a central processing unit, a ROM, a RAM, and the like, and adapted to perform signal processing in accordance with a program previously stored in the ROM while utilizing the temporary memory function of the RAM.

FIG. 2 is a block diagram showing an example of the functional configuration of the RFID circuit element To equipped in the RFID tag T.

In FIG. 2, the RFID circuit element To has the antenna 151 (tag-side antenna; antenna element) for performing transmission/reception of signals to/from the antennas 1A to 1E on the interrogator 100 side in a non-contact manner using a radio frequency of the UHF band or the like, and the IC circuit part 150 connected to the antenna 151.

The IC circuit part 150 includes a rectification part 152 for rectifying the carrier wave received by the antenna 151, a power source part 153 for storing the energy of the carrier wave rectified by the rectification part 152 to use the stored energy as a drive power source for the IC circuit part 150, a clock extraction part 154 for extracting a clock signal from the carrier wave received by the antenna 151 and supplying it to a control unit 157, a memory part 155 that functions as an information storage part capable of storing a predetermined information signal, a modem part 156 connected to the antenna 151, and the control unit 157 for controlling the actuation of the RFID circuit element To via the rectification part 152, the clock extraction part 154, the modem part 156, and the like.

The modem part 156 performs demodulation of a communication signal from the antennas 1A to 1E of the interrogator 100 received by the antenna 151, and on the basis of a reply signal from the control unit 157, modulates and reflects the carrier wave received by the antennas 1A to 1E.

The control unit 157 executes a basic control, such as interpreting the received signal demodulated by the modem part 156, generating a reply signal on the basis of an information signal stored in the memory part 155, and returning the reply signal by the modem part 156.

FIG. 3 is a block diagram showing the functional configuration of the radio frequency circuit 2 equipped in the interrogator 100.

In FIG. 3, the radio frequency circuit 2 is composed of a directivity switching control portion 211 connected to the antennas 1A to 1E having both the transmission and reception functions, a transmitting portion 212 for transmitting a signal to the RFID circuit element To via the directivity switching control portion 211 from the antennas 1A to 1E, and a receiving portion 213 for inputting a reflected wave from the RFID circuit element To received by the antennas 1A to 1E.

The directivity switching control portion 211 has transmission phase control units 201A to 201E respectively associated with the antennas 1A to 1E (some of which are omitted in the drawings; the same applies hereinafter), reception phase control units 202A to 202E respectively associated with the antennas 1A to 1E, a multiplexer 203 for adding up the outputs from the reception phase control units 202A to 202E, and transmit-receive splitters 204A to 204E (consisting of, for example, a circulator or the like; the same applies hereinafter) for connecting the transmission phase control units 201A to 201E and the antenna 1A to each other in a one-directional manner, that is, for transmitting signals from the transmission phase control units 201A to 201E to the antennas 1A to 1E and, at the same time, transmitting signals received by the antennas 1A to 1E to the reception phase control units 202A to 202E, respectively.

The transmission phase control units 201A to 201E include phase shifters 205A to 205E to which transmission phase control signals from the control circuit 4 are input and which set the phases of transmission radio signals in the antennas 1A to 1E so as to be variable in accordance with the transmission phase control signals, and transmission-side variable gain amplifiers 206A to 206E to which amplitude control signals included in transmission phase-shift control signals from the control circuit 4 are input and which amplify the signals input from the phase shifters 205A to 205E in accordance with the amplitude control signals and output the resultant to the transmit-receive splitters 204A to 204E, respectively.

The reception phase control units 202A to 202E include phase shifters 207A to 207E to which reception phase control signals from the control circuit 4 are input and which set the phases of reception radio signals in the antennas 1A to 1E so as to be variable in accordance with the reception phase control signals, and reception-side variable gain amplifiers 208A to 208E to which amplitude control signals included in reception phase-shift control signals from the control circuit 4 are input and which amplify the signals input from the phase shifters 207A to 207E in accordance with the amplitude control signals and output the resultant to the multiplexer 203, respectively. It should be noted that variable attenuators may be used instead of the transmission-side variable gain amplifiers 206A to 206E and the reception-side variable gain amplifiers 208A to 208E.

The transmitting portion 212 includes a crystal oscillating circuit or PLL-controlled oscillating circuit 215 that generates a carrier wave for making access to (performing reading from/writing to) the RFID tag information of the IC circuit part 150 of the RFID circuit element To, and a transmission-side multiplying circuit 216 (in the case of amplitude modulation, a variable amplification factor amplifier or the like may be used) for performing modulation (in this example, amplitude modification based on a "TX_ASK" signal from the control circuit 4) on the carrier wave generated on the basis of a signal supplied from the control circuit 4. This carrier wave is desirably set in the vicinity of 900 MHz or 2.45 GHz. The modulated wave modulated by the transmission-side multiplying circuit 216 is supplied to the transmission phase control units 201A to 201E, and is further supplied to the IC circuit part 150 of the RFID circuit element To via the transmit-receive splitters 204A to 204E and the antennas 1A to 1E.

The receiving portion 213 includes a reception-side first multiplying circuit 218 for performing multiplication between the reflected wave from the RFID circuit element To, which is received by the antennas 1A to 1E and multiplexed by the multiplexer 203 via the receiving phase control units 202A to 202E, and the carrier wave generated by the transmitting portion 212, a first band-pass filter 219 for extracting only a signal of a required band from the output of the reception-side first multiplying circuit 218, a reception-side first amplifier 221 for amplifying the output of the first band-pass filter 219 and supplying the resultant to a first limiter 220, a reception-side second multiplying circuit 222 for performing multiplication between the reflected wave from the RFID circuit element To, which is received by the antennas 1A to 1E and multiplexed by the multiplexer 203 via the receiving phase control units 202A to 202E, and a carrier wave whose phase has been shifted by 90° after being generated by the transmitting portion 212, a second band-pass filter 223 for extracting only a signal of a required band from the output of the reception-side second multiplying circuit 222, and a reception-side second amplifier 225 for inputting and amplifying the output of the second band-pass filter 223 and supplying the resultant to a second limiter 224. Further, a signal "RXS-I" output from the first limiter 220, and a signal "RXS-Q" output from the second limiter 224 are input to the signal processing circuit 3 for processing.

Further, the outputs of the reception-side first amplifier 221 and reception-side second amplifier 225 are also input to an RSSI (Received Signal Strength Indicator) circuit 226, and a signal "RSSI" indicating the strengths of these signals are input to the signal processing circuit 3. In this way, with the interrogator 100 according to this embodiment, demodulation of the reflected wave from the RFID circuit element To is performed through IQ quadrature demodulation.

After a reception signal or the like from the radio frequency circuit receiving portion 213 described above is input to the signal processing circuit 3, the signal processing circuit 3 performs predetermined computation processing, and in accordance with this, outputs a modulation control signal to the transmission-side multiplying circuit 216 of the transmitting portion 212. Further, in accordance with the results of computation processing by the signal processing circuit 3, the control circuit 4 outputs phase control signals or the like to the transmission phase control units 201A to 201E and the reception phase control units 202A to 202E. It should be noted that the control circuit 4 may be connected to a communication line via, for example, an input-output interface (not shown) so as to be capable of exchanging information with a route server, another terminal, a general purpose computer, an information server, and the like (not shown) connected to this communication line.

In this embodiment, directivity control is performed on the basis of a so-called phased array control or beam forming control, in which the directivity of the plurality of antennas 1A to 1E is retained so as to be strong only in one direction while sequentially changing the direction thereof. By taking advantage of the fact that when, at the time of signal reception, one signal is propagated obliquely at an angle with respect to the antennas 1A to 1E, a difference occurs in the phase of the received radio wave between the antennas 1A to 1E for an amount corresponding to a difference in path length thereof, the phase shifters are controlled by means of reception phase control signals so as to eliminate this phase difference, whereby the direction of directivity can be oriented to the direction of the RFID tag T (further, at the time of signal transmission as well, by controlling the phase shifters by means of transmission phase control signals according to the same principle as described above so that a phase difference occurs between transmission signals for an amount corresponding to a difference in path length, signal transmission is performed on the basis of the directivity in accordance with the existence position of the RFID tag T). In particular, the most prominent feature of the interrogator 100 of this embodiment resides in that when a large number of RFID tags T are distributed over a broad range, the directivity of the antennas 1A to 1E is controlled in accordance with the distance (=communication distance) from the interrogator 100 to each of the RFID tags T, whereby transmission/reception of RFID tag information is performed with respect to the RFID circuit elements To of all the RFID tags T efficiently and in a short period of time.

FIG. 4 is an explanatory diagram conceptually illustrating the directivity control operation for the antennas 1A to 1E by the interrogator 100.

In FIG. 4, by means of a control signal from the control circuit 4 of the interrogator 100, the directivity switching control portion 211 of the radio frequency circuit 2 is capable of switching the directivity (width and sharpness of the directivity) of the antennas 1A to 1E and its direction between a plurality of ones for both transmission and reception. In this example, in particular, the directivity of the antennas 1A to 1E is broadened (the beam width is broadened) in the case where the communication distance is short, and the directivity of the antennas 1A to 1E is narrowed (the beam width is narrowed) in the case where the communication distance is long.

That is, first, the directivity of the antennas 1A to 1E is made isotropic (made broadest), and a search of a search area A at a relatively short distance (FIG. 4A) is performed.

Next, a search of a search area B, which is at a distance farther than the search area A, is performed while slightly narrowing the directivity. In this case, because a slight directivity is imparted and the search area to be covered by one search is narrowed, the direction of directivity is switched a plurality of times (twice in this example), whereby a search is conducted while switching between two search areas B1, B2 (FIG. 4B).

Thereafter, a search of a search area C at an even farther distance is performed while further narrowing the directivity. In this case, since the directivity is further narrowed and thus the search area to be covered by one search is narrowed, the direction of directivity is switched even a greater number of times (seven times in this example), whereby a search is conducted while switching between seven search areas C-1, C-2, C-3, C-4, C-5, C-6, C-7 (see FIG. 4*c*)).

FIG. 5 is a flow chart showing the procedures of control performed by the control unit 4 in order to execute the directivity switching control (tag search control) for the antennas 1A to 1E of the interrogator 100 as described above.

In FIG. 5, this flow is started when, for example, a suitable designation for starting tag search is input through an operation portion (not shown).

First, in step S10, the initial value of the number of antennas N, the maximum number thereof, Nmax, and an antenna number increment ΔN are set as N=1, Nmax=5, and ΔN=2, respectively. Further, at the time when a search is conducted by retaining the directivity of the N antennas 1A to 1E (both for transmission and reception in this example) so as to be strong only in one direction while changing the direction thereof (=phased array control), the initial value of the angle θ of directivity (hereinafter referred to as the directivity angle as appropriate) with respect to a given reference position (for example, assuming that as seen from the interrogator 100, the direction right beside the interrogator 100 on one side is −90°, the front direction is 0°, and the direction right beside the interrogator 100 on the other side is +90°, with the angle increasing in the direction toward the other side; the same will hereinafter apply) is set as θ=θN, and the maximum angle (angle increase end point) θend as the final value when sequentially changing the directivity angle θ is set as θend=90°. It should be noted that the values of the initial directivity angle value θN and the angle increment thereof ΔθN (described later) are previously stored in, for example, the RAM of the control circuit 4 in a fixed (or rewritable) manner in the form of a table shown in the lower right in FIG. 5.

Next, the process transfers to step S20 where, in accordance with the value of the above-mentioned directivity angle θ (which is at first at the initial value θN =θ=0°), the phase associated with the antennas 1A to 1E (however, since N=1 is at first, only the antenna 1C is used, for example, in the case of N=3 described later, only the antennas 1A, 1C, 1E, and in the case of N=5, all of the antennas 1A to 1E are used; the same corresponding relationship will apply hereinafter) is determined. After outputting a corresponding phase control signal to the transmission phase control units 201A to 201E (or the reception phase control units 202A, 202B, 202C), a "Scroll ALL ID" signal, which is an unconditional tag information acquisition command with respect to the RFID tag T, is output, and the reply to that signal (if any) is received. It should be noted that the phase information and the like output to the transmission phase control units 201A to 201E or the reception phase control units 202A to 202C are previously stored in the control circuit 4 in correspondence with the directivity angle θ or the directivity.

More specifically, the control circuit 4 outputs a control signal to the signal processing circuit 3, and generates a "TX_ASK" signal and outputs it to the transmission-side multiplying circuit 216. The above-mentioned corresponding amplitude modulation is performed by the transmission-side multiplying circuit 216, thereby obtaining the "Scroll ALL ID" signal" as access information. On the other hand, the control circuit 4 generates a "T_PWR" signal and outputs it to the reception phase control units 202A to 202C, and signal amplification is performed in the transmission-side amplifiers 206A to 206E at the amplification factor (gain) based on the "T_PWR" signal (in the case where some of the antennas are not used as described above, the amplification factor thereof may be set 0 as appropriate); further, for the transmission phase control unit for which the amplification factor is not 0, the phase is determined by a phase control signal and finally transmitted via the antennas 1A to 1E, urging a reply from the RFID circuit element To of the RFID tag T as the search object. Since the above-described procedures at the time of signal generation are common to all the commands, the description thereof will be omitted in the following. Further, while the "TX_PWR" signal is represented by one signal line in the drawing for the sake of convenience, the "TX_PWR" signal actually consists of a plurality of signal lines and serves to control the amplification factor and phase of the transmission phase control circuit.

Further, if there is a RFID tag T that has responded to the "Scroll ALL ID" signal, the reply signal (RFID tag information including at least identification information) transmitted from the RFID circuit element To of that RFID tag T is received by the antennas 1A to 1E, and after phase control by the reception phase control units 202A to 202E, is taken in by the signal processing circuit 3 via the multiplexer 203 and the radio frequency circuit receiving portion 213.

Thereafter, in step S30, it is determined whether or not there has been a RFID tag T that has responded as a result of the tag search processing as described above (whether or not a RFID tag T has been detected). If there is one RFID tag that has responded, and information has been successfully acquired, the determination of step S35 is satisfied and the process transfers to step S37 where a sleep command is transmitted to that tag to put the tag to sleep. Accordingly, information of the RFID tag T can be acquired without the complicated step of identifying the RFID tag by repeatedly transmitting the search command and the conditional information acquisition command as described below, thus enabling efficient acquisition of information. On the other hand, when there are more than two RFID tags that have responded, since information acquisition fails due to collision (the case where information acquisition has failed although a valid reply signal has been received in response to a call), the determination of step S35 is not satisfied, and the process transfers to step S40.

In step S40, under the condition of the directivity angle θ, a "Ping (Ping-ID)" signal as a search command with respect to the RFID tag T, and a "Scroll ID" signal as a conditional information acquisition command are output and the corresponding replies are received, thereby recognizing (performing transmission/reception of RFID tag information to/from) all the RFID tags T that have responded during the tag search processing of step S20 mentioned above, and a "Sleep" signal as a sleep command is output to the RFID tags T for which identification has been completed (for which transmission/reception of RFID tag information has been completed), thus sequentially putting the RFID tags T to sleep.

More specifically, part of ID (tag identification information) is specified by the "Ping" signal, and responses from the corresponding RFID tags T are detected in a temporally separated manner. For the RFID tags T thus detected in a layered manner while being temporally separated, all the IDs are individually acquired using the "Scroll-ID" signal, and once the acquisition is complete, the RFID tags T are put to sleep by the sleep command (so that there will be no response thereafter). By repeating the above-described procedures while varying the specified ID, the IDs of all the RFID tags T whose responses have been successfully detected in step S20 are completely detected individually.

After step S37 or step S40 described above is finished, the process returns to step S20 where, in the same manner as described above, a "Scroll All ID" signal as an unconditional tag information acquisition command with respect to the RFID tag T is output. At this time, in step S37 or step S40 described above, since transmission/reception of RFID tag information of the RFID tags T that can respond with the directivity at this time has been finished and all the RFID tags have been put to sleep, there is no response. As a result, the determination of step S30 is not satisfied, and the process transfers to step S50.

In step S50, $\Delta\theta N$ mentioned above (at this point $\Delta\theta 1=100°$) is added to the directivity angle $\theta$.

Thereafter, the process transfers to step S60 where it is determined whether or not $\theta$ has become larger than $\theta$end ($=90°$) mentioned above. At this point, $\theta=100°$ by adding $\Delta\theta N(=\Delta\theta 1=100°)$ to the initial $\theta$ ($=\theta 1=0°$). Since $\theta$ thus becomes larger than $\theta$end, the determination of step S60 is satisfied, and the process transfers to step S70.

In step S70, it is determined whether or not the number of antennas N has become N=Nmax (5 in this example). Since N=1 at first as described above, this determination is not satisfied, and the process transfers to step S80. In step S80, $\Delta N$ (2 in this example) mentioned above is added to the number of antennas N (thus, N increases from 1 to 3 at first). Accordingly, $\theta=\theta N=-45°$, and $\Delta\theta N=90°$ (see the table in the lower right in FIG. 5). Thereafter, the process returns to step S20 and the same procedures are repeated.

That is, with the directivity angle $\theta=-45°$, the "Scroll All ID" signal or the like is transmitted and the tags that have responded to this "Scroll All ID" signal are put to sleep as described above in steps S20 to S40; thereafter, in step S50, $\Delta\theta N$ ($=90°$) is further added to $\theta$, thereby increasing $\theta$ from $-45°$ to $45°$. Since this value of $\theta$ is larger than $\theta$end, the determination of step S60 is not satisfied and the process returns to step S20, and the same search is repeated with the directivity angle $\theta=45°$. Accordingly, after $\theta=-45°$, the search is next performed with $\theta=45°$ (the area B-1→the area B-2 in FIG. 4).

That is, with the directivity angle $\theta=45°$, the "Scroll All ID" signal or the like is transmitted and the tags that have responded to this "Scroll All ID" signal are put to sleep as described above in steps S20 to S40; thereafter, in step S50, $\Delta\theta N$ ($=90°$) is further added to $\theta$, thereby increasing $\theta$ from $45°$ to $135°$. Since this value of $\theta$ is larger than $\theta$end, the determination of step S60 is not satisfied, and in step S80 after step S70, $\Delta N$ is added to N (that is, N=5), and the process returns to step S20 again.

Then, further, while putting to sleep the tags that have responded to the "Scroll ALL ID" signal or the like transmitted in steps S20 to S60, $\theta$ is increased from $\theta N$ ($=-75°$) at increments of $\Delta\theta N$ ($=25°$) (the area C-1→the area C-2→ . . . the area C-7 in FIG. 4C mentioned above) so that $\theta$ increases from $-75°$ to $-50°$ to . . . $75°$ to $100°$; when $\theta$ has become larger than $\theta$end, the process transfers from step S60 to step S70, and the determination of step S70 is satisfied since N=5 at this point, and this flow is ended.

In the foregoing description, the antennas 1A, 1B, 1C, 1D, 1E each constitute an antenna element as recited in the claims.

Further, the directivity switching control portion 211 of the radio frequency circuit 2, and the control circuit 4 constitute directivity control means for controlling the directivity of a plurality of antennas in accordance with at least the communication distance of information communication; of these, the directivity switching control portion 211 constitutes direction switching means for retaining the directivity of the plurality of antenna elements so as to be strong only in one direction while sequentially changing the direction thereof. Further, the procedure of step S80 in the flow of FIG. 5 performed by the control circuit 4 constitutes antenna increasing/decreasing means for increasing/decreasing the number of antenna elements that are used from among the plurality of antenna elements, in accordance with at least the communication distance of information communication.

With the interrogator 100 according to this embodiment configured as described above, when the communication distance from the antennas 1A to 1E is relatively short (for example, the areas B-1, B-2 in FIG. 4), (in this example) the number of antennas is reduced to broaden the directivity, and even when the directivity angle $\theta$ is switched by a large interval (the area B-1→B-2), the probability of the necessity to perform transmission/reception of information with respect to a large number of RFID circuit elements To at once is low, and information acquisition can be successfully performed by transmitting an unconditional tag information acquisition command, thereby enabling efficient information acquisition. Further, when the communication distance is relatively long (for example, the areas C-1 to C7 in FIG. 4C), (in this example) the number of antennas is increased to narrow the directivity and, further, since the communication range is restricted by sequentially switching the directivity angle by a small interval (the area C-1→the area C-2→the area C-3→the area C-4→the area C-5→the area C-6→the area C-7), the probability of succeeding in information acquisition by transmitting an unconditional information acquisition command is high, thereby enabling efficient information acquisition.

Since the optimum antenna directivity is thus realized by using broad directivity when the communication distance is short and narrow directivity when the communication distance is long, as compared with the structure of the related art in which the same directivity is used irrespective of whether the communication distance is short or long, even in the case where the RFID circuit elements To are distributed over a broad area (but the number of RFID circuit elements is not extremely large), the transmission/reception of RFID tag information can be efficiently performed in a short period of time.

Further, generally speaking, while the directivity of the antenna may be strengthened (=narrowed) in order to extend the communication distance to the RFID tags T, if the directivity of the antenna is strengthened (narrowed) during short-distance communication when the RFID tags T are at short distances, efficient RFID tag detection becomes difficult to perform as the difference in reception sensitivity/transmission sensitivity due to the difference in position between the respective tags T becomes excessively large. In this embodiment, the above-mentioned problem is avoided by narrowing the directivity during long-distance communication while keeping the directivity broad as it is during short-distance communication, thereby realizing an optimum antenna directivity in accordance with the distance.

Further, in this embodiment, the number of antennas 1A to 1E used during short-distance communication is set relatively small. As a result, the beam width of the radiated radio waves becomes large (see FIGS. 4A and 4B), which advantageously makes it possible to enhance the follow-up property with respect to a change in the position of the RFID tag T. Further, conversely, the number of antennas 1A to 1E used during long-distance communication is set relatively large. Accordingly, the beam width is narrowed (see FIG. 4C), while advantageously allows strong radio waves to reach a far distance.

A second embodiment of the present invention will now be described with reference to FIGS. 6 to 13. According to this embodiment, when a large number of tags respond at once during tag search due to the phased array control as described in the first embodiment, the search is conducted by further splitting the search area into smaller areas, and the control of transmission electric power is also implemented at the same time. The portions that are the same as those of the first embodiment are denoted by the same reference numerals, and description thereof is omitted as appropriate.

FIGS. 6 and 7 are explanatory diagrams corresponding to FIG. 4 of the first embodiment, conceptually illustrating the directivity control operation for the antennas 1A to 1E by an interrogator 200 according to this embodiment having the same configuration as that of the above-described interrogator 100.

First, in FIG. 6, like the interrogator 100 described above, by means of a control signal from the control circuit 4 of the interrogator 200, the directivity switching control portion 211 of the radio frequency circuit 2 is capable of switching the directivity (width and sharpness of the directivity) of the antennas 1A to 1E and its direction between a plurality of ones for both transmission and reception. At first, with the directivity of the antennas 1A to 1E being set as isotropic (broadest), and the transmission electric power being set at the minimum, a search of a search area D at a relatively short distance from the antennas 1A to 1E (FIG. 6A) is performed.

Next, a search of a search area E at a distance slightly farther than the search area D is performed while slightly narrowing the directivity and, at the same time, increasing the transmission electric power. In particular, the search is conducted by splitting the search area E into two search areas E-1, E-2 while switching the direction of directivity a plurality of (two in this example) times (FIG. 6B).

Then, referring to FIG. 7, a search of a search area F, a search area G, and a search area H, which are at even farther distances, is performed by the same method while sequentially narrowing the directivity even further and further increasing the transmission electric power. In this case, in the same manner as described above, the number of times for switching the direction of directivity is sequentially increased, so that the search is conducted by switching between three search areas F-1, F-2 F-3 with respect to the search area F, the search is conducted by switching between four search areas G-1, G-2, G-3, G-4 with respect to the search area G, and the search I conducted by switching between five search areas H-1, H-2, H-3, H-4, H-5 with respect to the search area H.

FIG. 8 is an explanatory diagram conceptually illustrating the search operation based on area splitting as described above, which represents the most prominent feature of this embodiment.

In this example, the above-mentioned subdivision search operation at the time of making a search of the search area D at a relatively short distance from the antennas 1A to 1E is illustrated as an example. That is, in the case where a large number of RFID tags T have been detected at a time (or a large number of RFID tags have been assumed to exist) (FIG. 8A) as a result of the search with respect to the search area D described above with reference to FIG. 6A, the directivity is extremely narrowed, and by sequentially switching the direction of directivity so as to further split the search area D into a plurality of small areas d-1 to d-7, a search is sequentially made of these search areas d-1 to d-7 (FIG. 8B). At this time, a large number of RFID tags T are assumed to exist within the communication range in the case where when, for example, specifying part of ID (tag identification information) by a "Ping" signal as a search command, and detecting responses from the corresponding RFID tags T in a temporally separated manner, a large number of collisions occur and information acquisition frequently fails even through reply signals have been issued.

FIG. 9 is a flow chart showing the procedures of control performed by the control circuit 4 of the interrogator 200 according to this embodiment in order to execute the directivity switching control (tag search control) for the antennas 1A to 1E mentioned above.

In FIG. 9, this flow is started when, for example, a suitable designation for starting tag search is input through an operation portion (not shown).

First, in step S110, the initial value of the number of antennas n, the maximum number thereof. Nmax, and the threshold number no for whether or not to perform the above-mentioned subdivision are set as n=1, nmax=5, and no=4, respectively. Further, at the time when a search is conducted by retaining the directivity of the n antennas 1A to 1E (both for transmission and reception in this example) so as to be strong only in one direction while changing the direction thereof (=phased array control or beam forming control), the maximum angle θend of the directivity angle θ with respect to a given reference position (for example, assuming that as seen from the interrogator 200, the direction beside the interrogator 200 on one side right is −90°, the front direction is 0°, and the direction right beside the interrogator 100 on the other side is +90°, with the angle increasing in the direction toward the other side; the same will hereinafter apply) is set as θend=90°.

Thereafter, the process transfers to step S120 where the output value (power) of transmission electric power P=Pn (for example, it increases in correspondence with the number of antennas n in the manner of P1<P2<P3<P4<P5; P1 at the beginning is the minimum transmission electric power), and directivity range (plus or minus angular range around the directivity angle θ) D=Dn (substantially non-directional at first since D1=90°) are set, and further, as the initial value of the directivity angle θ, θ=θn is set.

It should be noted that the values of the directivity range Dn, initial directivity angle value θn, and directivity angle increment Δθn (described later) are previously stored in, for example, the RAM of the control circuit 4 in a fixed (or rewritable) manner in the form of a table shown in the lower right in FIG. 9, together with the values of dn, Δθxn that will be described later.

Next, the process transfers to step S130. After the phase associated with the antennas 1A to 1E is determined in accordance with the value of the above-mentioned directivity θ (which is at first the initial value θn=θ1=0°) so that Dn(n−1)= D1=90°, and corresponding phase control signal and amplitude control signal (for controlling the amplification factor of the transmission phase control unit) are output to the transmission phase control units 201A to 201E (or the reception phase control units 202A, 202B, 202C), a "Scroll ALL ID" signal, which is an unconditional tag information acquisition command with respect to the RFID tag T, is output, and the reply to that signal (if any) is received. It should be noted that since the details of the procedures at the time of signal generation are the same as those of step S20 in the flow of FIG. 5 according to the first embodiment, the description thereof is omitted. Further, as in the first embodiment, the detailed procedures at the time of signal generation are common to all the commands. Further, if there is a RFID tag T that has responded to the "Scroll ALL ID" signal, the reply signal (RFID tag information including at least identification information) transmitted from the RFID circuit element To of that RFID tag T is received by the antennas 1A to 1E, and after phase control by the reception phase control units 202A to 202E, is taken in by the signal processing circuit 3 via the multiplexer 203 and the radio frequency circuit receiving portion 213.

Thereafter, in step S140, it is determined whether or not there has been a RFID tag T that has responded as a result of the tag search processing as described above (whether or not a RFID tag T has been detected). If there has been at least one RFID tag T that has responded (if a reply signal has been received in response to a call), the determination is satisfied and the process transfers to step S150 where it is further determined whether or not RFID tag information of the RFID circuit element To of the corresponding RFID tag T has been successfully acquired from the reply signal (in other words, whether or not the number of responsive tags is one and information has been successfully acquired solely through simultaneous reply signal reception by an unconditional tag information acquisition command).

If RFID tag information has been properly acquired, the determination of step S150 is satisfied and the process transfers to step S160 where a "Sleep" signal as a sleep command is output to the RFID tag T for which identification has been completed through information acquisition (for which transmission/reception of the RFID tag information has been completed) to thereby put the RFID tag T to sleep, and the process returns to step S130 to repeat the same procedures.

In step S150, if RFID tag information has not been properly acquired, the determination is not satisfied, and the process transfers to step S170.

In step S170, under the condition of the directivity angle θ, a "Ping (Ping-ID)" signal as a search command with respect to the RFID tag T is output, and the corresponding reply signals that are sequentially returned in a layered manner are received. More specifically, part of ID (tag identification information) is specified by the "Ping" signal, and responses from the corresponding RFID tags T are detected in a temporally separated manner.

The process then transfers to step S180, and with respect to the RFID tags T detected in a layered manner while being temporally separated as described above in step S170, it is determined whether or not the number of the RFID tags T is extremely large (in other words, whether or not a large number of RFID tags are densely distributed to a degree that makes it difficult to acquire information unless the search is conducted again by performing area subdivision as will be described later: see FIG. 8A described above). This can be determined from the degree of occurrence (frequency) of errors at the time of detection. If there are no or few errors, it is determined that the number of RFID tags T is small (not densely distributed), and if there are many errors, it is determined that the number of RFID tags is large (densely distributed). If the RFID tags T are not that densely distributed (if, although a somewhat large number of RFID tags T have been detected in step S170, the number of RFID tags is not so large as to require a search to be performed again using subdivided areas), this determination is not satisfied, and the process transfers to step S190.

In step S190, in the same manner as in step S40 of FIG. 5 mentioned above, under the condition of the directivity angle θ, a "Ping (Ping-ID)" signal as a search command with respect to the RFID tag T, and a "Scroll ID" signal as a conditional information acquisition command are output and the corresponding responses are received, thereby recognizing (performing transmission/reception of RFID tag information to/from) all the RFID tags T that have responded during the tag search processing of step S170 mentioned above, and a "Sleep" signal as a sleep command is output to the RFID tags T for which identification has been completed (for which transmission/reception of RFID tag information has been completed), thus sequentially putting the RFID tags T to sleep.

More specifically, as described above, for the RFID tags T thus detected in a layered manner while being temporally separated, all the IDs are individually acquired using the "Scroll-ID" signal, and once the acquisition is complete, the RFID tags T are put to sleep by the sleep command (so that there will be no response thereafter). By repeating the above-described procedures while varying the specified ID, the IDs of all the RFID tags T whose responses have been successfully detected in step S170 are completely detected individually. When this step S190 is finished, the process transfers to step S250 (details thereof will be described later).

On the other hand, if, in step S180 mentioned above, the number of the RFID tags detected in step S170 described above is extremely large, the determination of step S180 is satisfied and the process transfers to step S200. In step S200, it is determined whether or not the number of antennas n at this point is smaller than the threshold number no (=4) for whether or not to perform the above-mentioned subdivision.

If n is equal to or larger than 4, the determination is not satisfied, the process transfers to step S190 described above, and the same procedures as those described above are performed thereafter. This is because there is not much point in performing subdivision since, as exemplified by the areas G-1 to G-4 and areas H-1 to H-5 in FIG. 7, the widths of these areas themselves have already become relatively narrow due to the directivity (since the directivity is narrow from the start, there is no point in narrowing it further). If n is equal to or smaller than 3, the determination is satisfied, and the process transfers to step S210.

In step S210, the directivity range (corresponding to D described above) Dx around the directivity angle Ox of the antennas 1A to 1E when performing the re-search control (directivity switching control) based on the subdivided areas described above, is set as Dx=dn. Further, using the value of θ at this point, the initial value of the directivity angle θx at the time of performing the re-search mentioned above is set as θx = θ−D+dn, which is obtained by subtracting the amount corresponding to the directivity range from the center θ of directivity and further adding the above-mentioned directivity range dn to the resultant. Further, based on the same principle, the maximum angle θxend of the directivity angle θx at the time of performing the re-search mentioned above is set as θxend =θ+D−dn, which is obtained by adding the directivity range to the center θ of directivity and subtracting the above-mentioned directivity range dn from the resultant.

It should be noted that the value of the directivity range dn at the time of performing re-search based on the above-mentioned subdivided areas is previously stored in, for example, the RAM of the control circuit 4 in a fixed (or rewritable) manner in the form of the table shown in the lower right in FIG. 9, together with the values of the directivity angle increment Δθn (described later), Dn, θn, and Δθn mentioned above.

The process then transfers to step S220 where, in the same manner as in step S190 described above, under the condition of the directivity angle θ, a "Ping (Ping-ID)" signal as a search command with respect to the RFID tag T, and a "Scroll ID" signal as a conditional information acquisition command are output and the corresponding replies are received, thereby recognizing (performing transmission/reception of RFID tag information to/from) all the RFID tags T that have responded during the tag search processing of step S170 mentioned above, and a "Sleep" signal as a sleep command is output to the RFID tags T for which identification has been completed (for which transmission/reception of RFID tag information has been completed), thus sequentially putting the RFID tags T to sleep.

Then, the process transfers to step S230 where Δθxn mentioned above (Δθx1=26° at this point) is added to the directivity angle θx mentioned above. Thereafter, the process transfers to step S240 where it is determined whether or not θx has become larger than θxend mentioned above.

Since the value of θx is smaller than θxend at first, the determination of step S240 is not satisfied and the process returns to step S220, and while increasing the directivity angle θx at increments of 26°, the same procedures are repeated until the directivity Ox become larger than θxend. Accordingly, when n=1, for example, a search is conducted by sequentially changing the directivity angle θx by steps of 26°in the manner of the area d-1→the area d-2→the area d-3→the area d-4→the area d-5→the area d-6→the area d-7, and the tags that have responded are sequentially put to sleep. Then, when the search of the area d-7 is finished, and Δθxn (=26°) is added in step S230, Δθx becomes larger than Δθxend in step S240. The determination of step S240 is thus not satisfied, and the process transfers to step S250.

Through steps S130 to step S240 described above, with respect to one of the areas (large areas) E-1 and E-2, and F-1 to F-3 shown in FIGS. 6A, 6B, and 7, while performing re-search by subdividing the search area into smaller areas (for example, the areas d-1 to d-7 mentioned above) as required, the search for and recognition of (=acquisition of RFID tag information) all the RFID tags that exist within that one area are completed.

Thereafter, the process transfers to step S250 where Δθn (Δθ1=100° since n=1 at this point) is added to the directivity angle θ corresponding to the above-mentioned one area (large area).

Then, the process transfers to step S260 where it is determined whether or not θ has become larger than θend (=90°) mentioned above. At this point, by adding ΔθN (=Δθ1=100°) to θ (=θ1=0°) at the beginning, θ=100° and thus becomes larger than θend, so the determination of step S260 is satisfied, and the process transfers to step S270.

In step S270, it is determined whether or not n=nmax (=5). Since n=1 at first as described above, this determination is not satisfied, and the process transfers to step S280. In step S280, 1 is added to n mentioned above. It thus follows that θ=θn=−45°, Δθm=90°, and Dn=45° (see the table in the lower right in FIG. 9), and also P=Pn (=P2>P1). Thereafter, the process returns to step S120, and the same procedures are repeated.

That is, with the directivity angle θ=−45°, as described above, in steps S130 to S240, after a "Scroll ALL ID" signal is transmitted and RFID information is acquired, the corresponding tags are put to sleep; alternatively, after RFID tag information is acquired by performing re-search by subdividing the area as appropriate and using a "Ping (Ping-ID) signal, a "Scroll ID" signal, and a "Sleep" signal while increasing the directivity angle θ within the subdivided areas (note that dn=15°, and Δθxn=30°), and the corresponding tags are put to sleep, in step S250, Δθn (=90°) is further added to θ, thereby increasing θ from −45° to 45°. Since this value of θ is smaller than θend, the determination of step S260 is not satisfied and the process returns to step S130, and the same search is repeated with the directivity angle θ=45°. Accordingly, after θ=−45°, the search is next performed with θ=45° (the area E-1→the area E-2 in FIG. 6B and FIG. 7).

That is, with the directivity angle θ=45°, in steps S130 to S240, in the same manner as described above, after RFID tag information is acquired and the corresponding tags are put to sleep using a "Scroll All ID" signal or further a "Ping (Ping-ID) signal, a "Scroll ID" signal, and a "Sleep" signal, Δθn (=90°) is further added to θ in step S250, thereby increasing θ from 45° to 135°. Since this value of θ is larger than θend, the determination of step S260 is not satisfied, and after step S270, 1 is added to n (that is, n=3) in step S280, and the process returns to step S120 again.

Thereafter, while increasing the value of n in the same manner as described above, the same procedures are repeated until n=5. It should be noted, however, that as described above, when n=4, at least the determination of step S200 is not satisfied, so steps S210 to S240 are not executed, and a re-search based on subdivided areas is not performed (no subdivision is performed with respect to the areas G-1 to G-4 and the areas H-1 to H-5).

When n=5, the determination of step S270 is satisfied, and the flow of FIG. 9 is ended.

In the foregoing description, the directivity switching control portion 211 of the radio frequency circuit 2, and the control circuit 4 in the interrogator 200 constitute directivity control means as recited in the claims, for controlling the directivity of a plurality of antenna elements in accordance with at least the communication distance of information communication.

Further, in the flow shown in FIG. 9 executed by the control circuit 4, step S120 in which, in association with the directivity, P=Pn is set in accordance with n constitutes electric power controlling means for increasing/decreasing transmission power in accordance with at least the communication distance of information communication. Further, steps S210 to S240 in this flow constitute split area setting means for setting small areas by splitting a communication area into a plurality of areas in accordance with the number of RFID circuit elements that exist or that are expected to exist within the communication area determined by transmission power and directivity.

In this embodiment as well, as in the first embodiment described above, the broad/narrow directivity is selectively used between the case where the communication distance is short and the case where the communication distance is long so as to realize the optimum antenna directivity, which makes it advantageously possible to perform transmission/reception of RFID tag information efficiently in a short period of time even when the RFID circuit elements To are distributed over a broad area. In particular, since the directivity becomes narrower as n becomes larger, the probability of successful information acquisition is increased by simply transmitting a "Scroll All ID" signal (unconditional tag information acquisition command) at first. As a result, all the RFID tags T can be detected efficiently in a short period of time. Further, by gradually increasing the electric power output value Pn at this time, the detection of RFID tags at long distances is also facilitated. At this time, since the RFID tags at shorter distances whose information have been acquired are all in the sleep state, it is possible to prevent errors from occurring due to unnecessary collision of reply signals.

In addition, in this embodiment, the communication area is split into small areas (the areas d-1 to d-7 and the like) in accordance with the number of RFID tags in the communication areas D, E, F determined by the electric power output value P and the directivity angle θ at the time of communication, and the directivity range D, and transmission/reception of information with respect to the RFID circuit elements To is performed for each of the small areas. This enables efficient transmission/reception of RFID tag information with reduced errors. That is, when detection of RFID tags T is to be performed at once over a broad range, in the case where there are a large number of tags (in particular, in the case where the ID-specified portions of the RFID tags match each other in a large number of bits), the number of times of discrimination thereof becomes enormous, and a huge processing time is required. According to this embodiment, as described above, in the large areas D, E with one directivity angle θ, detection is performed by further dividing the detection range into the small areas d-1 to d-7 and the like, whereby the above-mentioned number of times of discrimination is drastically reduced to enable detection in a short period of time.

It should be noted that the present invention is not limited to the above-described embodiment but various modifications are possible without departing from the scope and technical idea of the present invention. Hereinbelow, such modifications will be described in order.

(1) Another Variation of Directivity Control

In the above-described embodiment, a so-called phased array antenna control, in which both at the time of transmission and reception, the directivity synthesized by the antennas 1A to 1E is retained so as to be strong only in one direction while being sequentially changed in its direction, and predetermined computation processing is performed in accordance with the signal strengths of and the phase difference between the antennas 1A to 1E with respect to each direction, thereby identifying the positions of the RFID tags T. However, the present invention is not limited to this. That is, the directivity phased array control may be performed only at the time of transmission or reception. In the case where phased array control is performed only during reception, at the time of transmission, the gain of the variable gain amplifiers 206A, 206B, 206D, 206E of the transmission phase control units 201A, 201B, 201D, 201E is set as 0 so that the antennas 1A, 1B, 1D, 1E are not used for transmission, and transmission is performed using only the antenna 1C. The same applies to the case where phased array control is performed only for reception.

Further, the present invention is not limited to the phased array control, either; other modes of directivity control may also be employed. That is, a method (method based on a so-called active control) may be employed in which the directivity synthesized by the antennas 1A to 1E is varied so as to achieve an optimum reception sensitivity with respect to the RFID circuit elements To, and predetermined computation processing is performed in accordance with the signal strengths of and the phase difference between the respective antennas.

As an example of such a case, FIGS. 10A to 10C show a case where active array control is performed (used in combination) only at the time of reception. FIG. 10A shows a case where, at the time of tag search in the area B-1 executed by the interrogator 100 according to the first embodiment described above, a plurality of (in this example, two) RFID tags T-1, T-2 are present within the range of the area B-1. FIGS. 10B and 10C each show the directivity when active array processing is performed at the time of reception in this case. FIG. 10B shows a case where the reception directivity is changed so that an optimum directivity can be attained with respect to the RFID tag T-1 on the left-hand side in the drawing, and FIG. 10C shows a case where the reception directivity is changed so that an optimum directivity can be attained with respect to the RFID tag T-2 on the right-hand side in the drawing.

Further, it is also possible to perform active control at the time of reception, and perform phased array or beam forming control at the time of transmission. Alternatively, the antennas may be operated as phased array antennas or beam forming antennas that are weighted in the same manner both for transmission and reception only in the case of long distance communication, thereby enhancing the quality of communication with RFID tags at long distances. Further, in the case of medium distance communication (on the order of one wavelength), the antennas may be operated as the phased array antennas or beam forming antennas only for the transmission side or reception side.

FIG. 11 is a flow chart illustrating, of the control procedures executed by the control circuit 4, control procedures relating to the above-mentioned active array control at the time of reception.

In FIG. 11, first, in step S310, the phase of the phase shifters 207A to 207E and the gain (signal amplitude) of the variable gain amplifiers 208A to 208E are set to predetermined initial values.

Thereafter, in step S320, Scroll ID signals specifying the RFID circuit elements To of the target RFID tags T are output from the transmission phase control units 201A to 201E via the antennas 1A to 1E, and reply signals transmitted from the corresponding RFID circuit elements To are received by the reception phase control units 202A to 202E by means of the antennas 1A to 1E and taken in via the multiplexer 203 and the radio frequency receiving portion 213.

In this case, instead of retaining the directivity of the antennas 1A to 1E in one direction and gradually changing the directivity angle θ thereof as in the above-described phased array control, the directivity of the respective antennas 1A to 1E is changed so as to attain an optimum reception sensitivity. Accordingly, with respect to phase control signals to the reception phase control units 202A to 202E associated with the antennas 1A to 1E from the control unit 4, predetermined weighting is performed for each of the antennas 1A to 1E, transmission/reception is repeated while varying this weighting to thereby perform convergent computation. Accordingly, after step S330 mentioned above is finished, in step S340, weighting with respect to the antennas 1A to 1E is determined in accordance with the values of reception signals RXS-I, RXS-Q from the limiters 220, 224; thereafter, in step S350, the corresponding phase and amplitude (gain) are set, and the corresponding phase control signals are output to the reception phase control units 202A to 202E.

The value of weighting at this time is stored in suitable storage means such as the RAM in the control circuit 4 while having its size compared against the previously stored value. As will be described later, when the determination of step S360 is not satisfied and the process returns to step S320 to repeat the same computation, the computation is determined to have converged if the change from the previously stored value is regarded as being equal to or less than a predetermined value. As described above, in this modification, with respect to the directivity generated by the antennas 1A to 1E, search is made so that the detection signal strength thereof becomes the maximum value, that is, the optimum sensitivity. When the value of weighting has become substantially constant and the computation has converged, the determination of step S360 is satisfied; otherwise, the determination is not satisfied, so the process returns to step S320 and the same computation procedures are repeated.

When the directivity for achieving an optimum reception sensitivity has been found for each of the antennas 1A to 1E by thus repeating the process in the order of step S320→step S330→step S340→step S350Δstep S360, the computation is finished and the determination of step S360 is satisfied, and the process transfers to step S370. At this time, a deviation may occur between the tag direction and the antenna directivity, such as when an interfering signal source is present in the same direction as the RFID tag T. Further, the directivity may exhibit a maximum value with respect to a plurality of directions. Accordingly, the tag direction is an estimated value or a probability value.

In step S370, the direction in which the RFID tag T exists is estimated on the basis of the convergence results mentioned above. In step S380, on the basis of the signal strength at the time of the above-mentioned convergence, the coordinate position at which the RFID tag T exists is estimated.

In this way, an adaptive array control, in which the directivity synthesized by the antennas 1A to 1E is varied so as to achieve an optimum reception sensitivity with respect to the RFID tag T, is executed, thereby making it possible to detect the target RFID tag T with high sensitivity and, at the same time, estimate the direction and position of the target RFID tag T.

Further, as a partial modification of the second embodiment mentioned above, as shown in FIG. 12A, when a large number of RFID tags T are present within a given search area (large area), instead of subdividing the search area into small areas in step S210, transmitting a "Ping" signal in step S220, and switching the directivity little by little in step S230, a configuration may be employed in which reception signals from those RFID tags T are subjected to active array processing to thereby detect the direction from which responses have been received, and the directivity at the time of antenna transmission is oriented only to that direction (see FIG. 12B).

It should be noted that when, as shown in, for example, FIG. 13, two RFID tags T are present in the same direction, since discrimination by directivity cannot be performed even by means of the adaptive array processing at the time of reception as described above, the ordinary serial detection method (=method of performing detection sequentially by repeating the processing using a "Ping" signal, a "Scroll ID" signal, and a "Sleep" signal as in step S40 in FIG. 5) is used.

Further, the antennas used are not limited to the antennas 1A, 1B, 1C, 1D, 1E having the transmission and reception functions; at least one of these antennas may be replaced by a transmission-only antenna or a reception-only antenna.

(2) Command selection

It is also possible to select the kind of a command signal at the time of tag search through combination of the directivity of the antennas 1A to 1E and the electric power value. That is, the kinds of the above-mentioned various command signals as access information (the unconditional information acquisition command such as the "Scroll ALL ID" signal, the search command such as the "Ping" signal, and the conditional information acquisition signal such as the "Scroll ID" signal) may be subjected to switching control in accordance with, from among the directivity control and the transmission power control, at least the directivity control. The followings may be conceived as the modes of such switching control.

(A) Relationship Between Directivity and Electric Power For Each Signal (Command) Alone (a) Transmit search command while setting large transmission power and broad directivity In this case, in a large range determined by broad directivity and large electric power, it is possible to perform transmission/reception of information with respect to a large number of RFID circuit elements by means of a search command.

(b) Transmit unconditional information acquisition command while setting small transmission power and broad directivity In this case, in a small range in close proximity to the interrogator 100, 200 determined by broad directivity and small transmission power, the probability of succeeding in the transmission/reception of information with respect to a small limited number of RFID tags T by means of an unconditional information acquisition command without using a search command becomes high.

(c) Transmit search command by setting small transmission power and narrow directivity In this case, in an extremely limited range in close proximity to the interrogator 100, 200 determined by narrow directivity and small transmission power, transmission/reception of information can be reliably performed with respect to densely distributed RFID tags T by means of a search command without errors.

(d) Generate unconditional information acquisition command while setting large transmission power and narrow directivity In this case, in a narrow range determined by narrow directivity and large transmission power, transmission/reception of information can be reliably performed with respect to a small limited number of RFID tags T by means of an information acquisition command.

(B) Relationship Between Directivity and Electric Power in Series of Search Procedures Using Respective Signals (a) Transmit search command while setting large transmission power and broad directivity →Transmit search command by setting small transmission power and narrow directivity →Transmit unconditional information acquisition command by setting large transmission power and narrow directivity That is, first, a search command is generated while setting large transmission power and broad directivity and is transmitted to RFID tags; if the number of RFID tags T that have responded is large (=corresponding to RFID tag number detecting means), transmission/reception of information is performed by generating a search command while setting the transmission power small and the directivity narrow and through subdivision into small communication ranges. When transmission/reception of information has thus been finished with respect to the RFID tags T in close proximity to the interrogator 100, 200, an information acquisition command is generated while setting the transmission electric power large and the directivity narrow, so transmission/reception of information is reliably performed with respect to the remaining RFID tags in a range far from the interrogator 100, 200, whereby transmission/reception of RFID tag information can be efficiently performed with respect to the RFID tags in all of the ranges.

(b) Transmit search command by setting large transmission power and broad directivity →Transmit unconditional information acquisition command by setting small transmission power and broad directivity →Transmit unconditional information acquisition command by setting large transmission power and narrow directivity That is, first, a search command is generated while setting large transmission power and broad directivity and is transmitted to RFID tags; if the number of RFID tags T that have responded is small (=corresponding to RFID tag number detecting means), an information acquisition command is generated while setting the transmission power small and the directivity broad, and transmission/reception of information is attempted within a limited communication range without issuing a search command at first. When transmission/reception of information has thus been finished with respect to the RFID tags T in close proximity to the interrogator 100, 200, an information acquisition command is generated by setting the transmission electric power large and the directivity narrow, and transmission/reception of information is efficiently performed with respect to the remaining RFID tags in a range far from the interrogator 100, 200, whereby transmission/ reception of RFID tag information can be efficiently performed with respect to the RFID tags in all of the ranges.

(C) Others

As another example, when, in connection with the above, the directivity is set broad at a short distance, if the unconditional information acquisition command is transmitted from the beginning, this results in a high probability of error occurrence due to collision, so the search command may be set from the beginning. Further, the unconditional information acquisition command may be transmitted from the beginning once the directivity has been narrowed to a certain degree.

It should be noted that in the foregoing description, the signal processing circuit 3 constitutes access information generating means for generating access information for accessing RFID tag information of the IC circuit part of the RFID circuit element, the transmitting portion 212 of the radio frequency circuit 2 constitutes information transmitting means for transmitting the access information generated by the access information generating means to the RFID circuit element in a non-contact manner via a plurality of antenna elements to thereby make access, and the control circuit 4 constitutes access information switching means for performing switching control of the kind of the access information generated by the access information generating means, in accordance with, from among the directivity control by the directivity control means and the transmission power control by the electric power control means, at least the directivity control.

As has been described in the foregoing by way of examples, by using various signals, for example, the unconditional information acquisition command, the conditional information acquisition command, and the search command, as appropriate in accordance with the directivity of the antennas 1A to 1E and the electric power output value, the information transmission/reception mode that is most suited for each of the case where the directivity is narrow and the case where the directivity is broad can be realized. As a result, transmission/reception of RFID tag information can be performed more efficiently in a short period of time.

Although not exemplified herein, it is to be understood that the present invention is implemented in various modified forms without departing from the scope of the present invention.

It is assumed that the "Scroll All ID" signal, the "Erase" signal, the "Verify" signal, the "Program" signal, the "Sleep" signal and the like used in the foregoing description conform to the specifications developed by EPC global. EPC global is a non-profit corporation jointly founded by the international EAN association, which is an international association of distribution codes, and the Uniformed Code Council (UCC), which is a distribution code association of the United States. It should be noted that signals that conform to other standards may be used as long as they serve the same function.

What is claimed is:

1. An interrogator for a RFID tag communication system, comprising:
   a plurality of antenna elements configured to perform information communication in a non-contact manner with an IC circuit part of a RFID circuit element to be interrogated; and
   a directivity control portion configured to control a directivity of said plurality of antenna elements in accordance with at least a communication distance of said information communication, wherein:
   said directivity control portion comprises a direction switching portion configured to retain said directivity of said plurality of antenna elements so as to be strong in only one direction while sequentially changing the direction with respect to which the directivity is made strong, and
   said direction switching portion makes an angular interval for switching said direction of directivity that is to be sequentially changed large when said communication distance is short, and makes the angular interval for switching said direction of directivity that is to be sequentially changed small when said communication distance is long.

2. The interrogator for a RFID tag communication system according to claim 1, wherein:
   said directivity control portion comprises an antenna increasing/decreasing portion configured to increase/decrease a number of antenna elements to be used from among said plurality of antenna elements, in accordance with at least said communication distance of said information communication.

3. The interrogator for a RFID tag communication system according to claim 2, wherein:
   said antenna increasing/decreasing portion increases the number of antenna elements to be used from among said plurality of antenna elements when said communication distance of said information communication is long.

4. The-An interrogator for a RFID tag communication system, comprising:
   a plurality of antenna elements configured to perform information communication in a non-contact manner with an IC circuit part of a RFID circuit element to be interrogated; and
   a directivity control portion configured to control a directivity of said plurality of antenna elements in accordance with at least a communication distance of said information communication, wherein:
   said directivity control portion changes said directivity of said plurality of antenna elements so that a reception sensitivity with respect to said RFID circuit element becomes optimum.

5. The interrogator for a RFID tag communication system according to claim 4, wherein:
   said directivity control portion comprises an antenna increasing/decreasing portion configured to increase/decrease a number of antenna elements to be used from among said plurality of antenna elements, in accordance with at least said communication distance of said information communication.

6. The-An interrogator for a RFID tag communication system, comprising:
   a plurality of antenna elements configured to perform information communication in a non-contact manner with an IC circuit part of a RFID circuit element to be interrogated; and
   a directivity control portion configured to control a directivity of said plurality of antenna elements in accordance with at least a communication distance of said information communication, wherein:
   said directivity control portion comprises RFID tag number detecting portion configured to detect a number of said RFID circuit elements that exist within a communication range, and said directivity control portion controls said directivity of said plurality of antenna elements in accordance with the number of RFID tags detected by said RFID tag number detecting portion.

7. An interrogator for a RFID tag communication system, comprising:
- a plurality of antenna elements configured to perform information communication in a non-contact manner with an IC circuit part of a RFID circuit element to be interrogated; and
- a directivity control portion configured to control a directivity of said plurality of antenna elements in accordance with at least a communication distance of said information communication,
- an electric power control portion for increasing/decreasing transmission power in accordance with at least said communication distance of said information communication; and
- an access information generating portion configured to generate access information for making access to RFID tag information of said IC circuit part of said RFID circuit element;
- an information transmitting portion configured to transmit said access information generated by said access information generating portion, to said RFID circuit element in a non-contact manner via said plurality of antenna elements to make the access; and
- an access information switching portion configured to switch the kind of access information that is first generated by said access information generating portion after control of directivity, in accordance with, from among control of said directivity by said directivity control portion and control of said transmission power by said electric power control portion, at least control of said directivity.

8. The interrogator for a RFID tag communication system according to claim 7, wherein:
said access information switching portion performs switching control so that in accordance with control of said directivity by said directivity control portion, said access information generating portion generates any one of an unconditional information acquisition command for unconditionally acquiring said RFID tag information of said IC circuit part, a conditional information acquisition command for acquiring said RFID tag information of said IC circuit part under a predetermined condition, and a search command for searching for and acquiring said RFID tag information of said IC circuit part under an indeterminate condition.

9. The interrogator for a RFID tag communication system according to claim 8, wherein:
said directivity control portion, said electric power control portion, and said access information switching portion perform control in concert with each other so as to generate said search command or said conditional information acquisition command while making said transmission power large and said directivity broad, and transmit said search command or said conditional information acquisition command to said RFID circuit element.

10. The interrogator for a RFID tag communication system according to claim 9, wherein:
after generating said search command while making said transmission power large and said directivity broad, and transmitting said search command to said RFID circuit element, when a large number of said RFID circuit elements are expected to exist, said directivity control portion, said electric power control portion, and said access information switching portion perform control in concert with each other so as to generate said search command while making said transmission power small and said directivity narrow, and transmit said search command to said RFID circuit element, and thereafter, generate said unconditional information acquisition command first while making said transmission power large and said directivity narrow, and transmit said unconditional information acquisition command to said RFID circuit element.

11. The interrogator for a RFID tag communication system according to claim 9, wherein:
after generating said search command while making said transmission power large and said directivity broad, and transmitting said search command to said RFID circuit element, when a small number of said RFID circuit elements are expected to exist, said directivity control portion, said electric power control portion, and said access information switching portion perform control in concert with each other so as to generate said unconditional information acquisition command while making said transmission power small and said directivity broad, and transmit said unconditional information acquisition command to said RFID circuit element, and thereafter, generate said unconditional information acquisition command while making said transmission power large and said directivity narrow, and transmit said unconditional information acquisition command to said RFID circuit element.

12. The interrogator for a RFID tag communication system according to claim 8, wherein:
said directivity control portion, said electric power control portion, and said access information switching portion perform control in concert with each other so as to first generate said unconditional information acquisition command after making said transmission power small and said directivity broad, and transmit said unconditional information acquisition command to said RFID circuit element.

13. The interrogator for a RFID tag communication system according to claim 8, wherein:
when a large number of said RFID circuit elements are expected to exist, said directivity control portion, said electric power control portion, and said access information switching portion perform control in concert with each other so as to generate said search command while making said transmission power small and said directivity narrow, and transmit said search command to said RFID circuit element.

14. The interrogator for a RFID tag communication system according to claim 8, wherein:
said directivity control portion, said electric power control portion, and said access information switching portion perform control in concert with each other so as to first generate said unconditional information acquisition command after making said transmission power large and said directivity narrow, and transmit said unconditional information acquisition command to said RFID circuit element.

* * * * *